US012641250B2

(12) United States Patent
Xiu et al.

(10) Patent No.: US 12,641,250 B2
(45) Date of Patent: May 26, 2026

(54) METHOD AND SYSTEM FOR DECODER-SIDE INTRA MODE DERIVATION FOR BLOCK-BASED VIDEO CODING

(71) Applicant: InterDigital Madison Patent Holdings, SAS, Paris (FR)

(72) Inventors: Xiaoyu Xiu, San Diego, CA (US); Yuwen He, San Diego, CA (US); Yan Ye, San Diego, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 18/914,428

(22) Filed: Oct. 14, 2024

(65) Prior Publication Data

US 2025/0039402 A1 Jan. 30, 2025

Related U.S. Application Data

(63) Continuation of application No. 18/206,918, filed on Jun. 7, 2023, now Pat. No. 12,149,703, which is a
(Continued)

(51) Int. Cl.
H04N 13/02 (2006.01)
H04N 19/11 (2014.01)
(Continued)

(52) U.S. Cl.
CPC ........... *H04N 19/154* (2014.11); *H04N 19/11* (2014.11); *H04N 19/147* (2014.11); *H04N 19/176* (2014.11)

(58) Field of Classification Search
CPC .... H04N 19/154; H04N 19/11; H04N 19/147; H04N 19/176
See application file for complete search history.

(56) References Cited

U.S. PATENT DOCUMENTS 5,600,627 A 2/1997 Hirokane et al.
5,606,627 A * 2/1997 Kuo ........................ G06T 7/593
348/E13.067
(Continued)

FOREIGN PATENT DOCUMENTS

EP 2394437 A1 12/2011
EP 2735151 A1 5/2014
(Continued)

OTHER PUBLICATIONS

Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.
(Continued)

*Primary Examiner* — Howard D Brown, Jr.
(74) *Attorney, Agent, or Firm* — Smadar Gefen

(57) ABSTRACT

Systems and methods are disclosed for encoding and for decoding of video data, including predicting a video block of the video data using decoder-side intra mode derivation (DIMD). The disclosed predicting techniques include selecting candidate intra prediction modes based on intra prediction modes used by neighboring video blocks. Techniques disclosed further include determining respective costs of using the selected candidate intra prediction modes to predict samples in a template region adjacent to the video block, deriving an intra prediction mode from the selected candidate intra prediction modes having the lowest cost, and predicting samples in the video block using the derived intra prediction mode.

20 Claims, 20 Drawing Sheets

Related U.S. Application Data continuation of application No. 16/096,236, filed as application No. PCT/US2017/031303 on May 5, 2017, now Pat. No. 11,722,677.

(60) Provisional application No. 62/367,414, filed on Jul. 27, 2016, provisional application No. 62/335,512, filed on May 12, 2016, provisional application No. 62/332,871, filed on May 6, 2016.

(51) Int. Cl.
| | | |
|---|---|---|
| *H04N 19/147* | (2014.01) | |
| *H04N 19/154* | (2014.01) | |
| *H04N 19/176* | (2014.01) | |

(56) References Cited

U.S. PATENT DOCUMENTS

| | | | | |
|---|---|---|---|---|
| 9,167,231 | B2 * | 10/2015 | Kawakami | H04N 13/239 |
| 11,722,677 | B2 * | 8/2023 | Xiu | H04N 19/11 |
| | | | | 375/240.03 |
| 2004/0184544 | A1 | 9/2004 | Kondo et al. | |
| 2012/0163455 | A1 | 6/2012 | Zheng et al. | |
| 2012/0218388 | A1 | 8/2012 | Kawakami et al. | |
| 2012/0230417 | A1 * | 9/2012 | Sole Rojals | H04N 19/129 |
| | | | | 375/240.18 |
| 2013/0028317 | A1 | 1/2013 | Parfenov et al. | |
| 2013/0142259 | A1 | 6/2013 | Lim et al. | |
| 2013/0266232 | A1 * | 10/2013 | Sato | H04N 19/176 |
| | | | | 382/233 |
| 2014/0010293 | A1 * | 1/2014 | Srinivasan | H04N 19/157 |
| | | | | 375/240.12 |
| 2014/0219342 | A1 | 8/2014 | Yu et al. | |
| 2017/0264904 | A1 * | 9/2017 | Koval | H04N 19/182 |
| 2017/0280163 | A1 * | 9/2017 | Kao | H04N 19/593 |
| 2020/0007797 | A1 * | 1/2020 | Covington | G06V 10/143 |
| 2020/0007810 | A1 * | 1/2020 | Hoevenaar | H04N 23/632 |
| 2022/0224895 | A1 * | 7/2022 | Wang | H04N 19/147 |
| 2023/0319289 | A1 * | 10/2023 | Xiu | H04N 19/11 |
| | | | | 375/240.03 |

FOREIGN PATENT DOCUMENTS

| | | | |
|---|---|---|---|
| EP | 2394437 | B1 | 4/2015 |
| EP | 2951996 | A1 | 12/2015 |
| WO | WO2010090749 | A1 | 8/2010 |

OTHER PUBLICATIONS

Zhang, Zhenming et al., "Improved Intra Prediction Mode-Decision Method". In Visual Communications and Image Processing, vol. 5960, Jul. 12, 2005 (Jul. 12, 2005), pp. 632-640.

Bross et al., "High Efficiency Video Coding (HEVC) Text Specification Draft 10 (for FDIS and Last Call)",. Joint Collaborative Team on Video Coding (JCT-VC) of ITU-T SG 16 WP3 and ISO/IEC JTC 1/SC 29/WG 11, Document No. JCTVC-L1003_v34, 12th Meeting, Geneva, Switzerland, Jan. 14, 2013, 310 pages.

Hao Zhang et al., "Fast Intra Prediction for High Efficiency Video Coding" In: "Advances in Databases and Information Systems", Jan. 1, 2012 (Jan. 1, 2012), Springer International Publishing, Cham 032682, XP055546684, ISBN: 978-3-319-10403-4. vol. 7674, pp. 568-577, DOI:10.1007/978-3-642-34778-8_53.

Wiegand, T et al., "Overview of H.264/AVC Video Coding Standard", IEEE Transactions on Circuits and Systmes for Video Technology, vol. 13, No. 7, Jul. 2003, 17 pages.

Motra, Ajit Singh et al., "Fast Intra Mode Decision for HEVC Video Encoder". IEEE International Conference on Software, Telecommunications and Computer Networks (SOFTCOM), Sep. 11, 2012, 5 pages.

Chen, Jianle et al., "Coding Tools Investigation for Next Generation Video Coding Based on HEVC" , Applications of Digital Image Processing XXXVIII, vol. 9599, International Society for Optics and Photonics, (2015), pp. 95991B-1 to 95991B-9.

Alshina, E et al., "Known Tools Performance Investigation for Next Generation Video Coding", ITU—Telecommunications Standardization Sector, Video Coding Experts Group (Vceg), SG16/Q6, VCEG-AZ05, Jun. 2015, 7 pages.

Discrete Consine Transform, http://ww.mathworks.com/help/images/discrete-consine-transform.html, Nov. 2012, 3 pages.

Karczewicz, M et al., "Report of AHG1 on Coding Efficiency Improvements", ITU—Telecommunications Standardization Sector, Video Coding Experts Group (VCEG), SG16/Q6, VCEG-AZ01, Jun. 2015, 2 pages.

SMPTE 421M, "VC-1 Compressed Video Bitstream Format and Decoding Process", SMPTE Standard, Apr. 2006, 493 pages.

International Telecommunication Union (ITU), Advanced Video Coding for Generic Audiovisual Services, Series H: Audiovisual and Multimedia Systems; Infrastructure of Audiovisual Services—Coding of Moving Video; ITU-T Tec H.264 and ISO/IEC/MPEG 4 Part 10, Advanced Video Coding for Generic Audiovisual Services, Nov. 2007, 680 pages.

Ohm, Jens-Rainer et al., "Report of AHG on Future Video Coding Standardization Challenges". International Organization for Standardization, Coding of Moving Pictures and Audio, ISO/IEC JTC1/SC29/WG11 MPEG2014/M36782, Jun. 2015, 4 pages.

Sharabayko Maxim P et al., "Iterative Intra Prediction Search for H.265/HEVC", 2013 International Siberian Conference on Control and Communications (SIBCON), IEEE, Sep. 12, 2013 (Sep. 12, 2013), pp. 1-4, XP032546362, DOI: 10.1109/SIBCON.2013.6693615 [Retrieved on Dec. 23, 2013].

An et al., "Block Partitioning Structure for Next Generation Video Coding", MediaTek Inc., ITU—Telecommunication Standardization Sector, Study Period 2013-2016, Study Group 16—Contribution 966 R3, Sep. 2015, 8 pages.

Chen , Jianle et. al., "Coding Tools Investigation for Next Generation Video Coding", ITU—Telecommunication Standardization Sector, Study Group 16, Contribution 806, COM16-C806, Jan. 2015, pp. 1-7.

"JEM-2.0 Reference Software", Available at <https://jvet.hhi.fraunhofer.de/svn/svn_HMJEMSoftware/tags/HM-16.6-JEM-2.0>, 1 page.

Xiu et al., "Decoder-side Intra Mode Derivation for Block-based Video Coding", Institute for Electrical and Electronics Engineers (IEEE), 2016 Picture Coding Symposium (PCS), Nuremberg, Germany, Dec. 4, 2016, 5 pages.

Sullivan, Gary J et. al., "Overview of The High Efficiency Video Coding (HEVC) Standard". IEEE Transactions on Circuits and Systems for Video Technology, vol. 22, No. 12, Dec. 2012, pp. 1649-1668.

Kamp, Steffen et al., "Decoder-Side Motion Vector Derivation for Block-Based Video Coding", IEEE Transactions on Circuits and Systems for Video Technology, vol. 22, No. 12, Dec. 2012, 14 pages.

Tan et al., "Intra Prediction by Averaged Template Matching Predictors", Consumer Communications and Networking Conferennce, 2007, CCNC Jul. 20, 2007 4th IEEE PI, 1, Jan. 2007, pp. 405-409.

* cited by examiner

0: Planar
1: DC

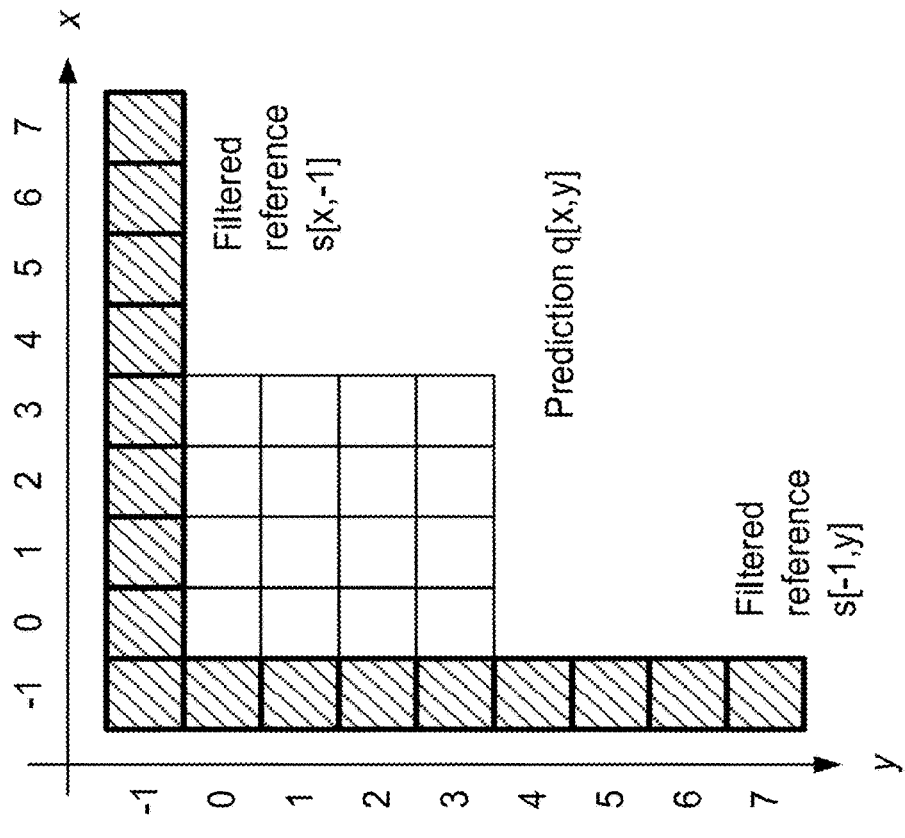
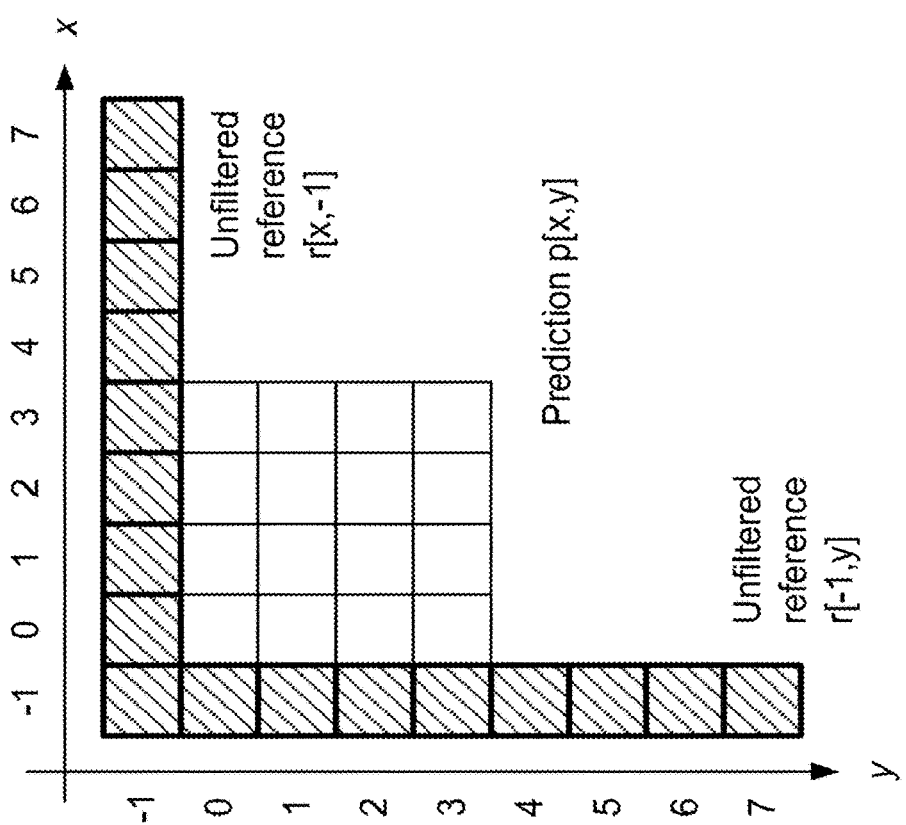
FIG. 6

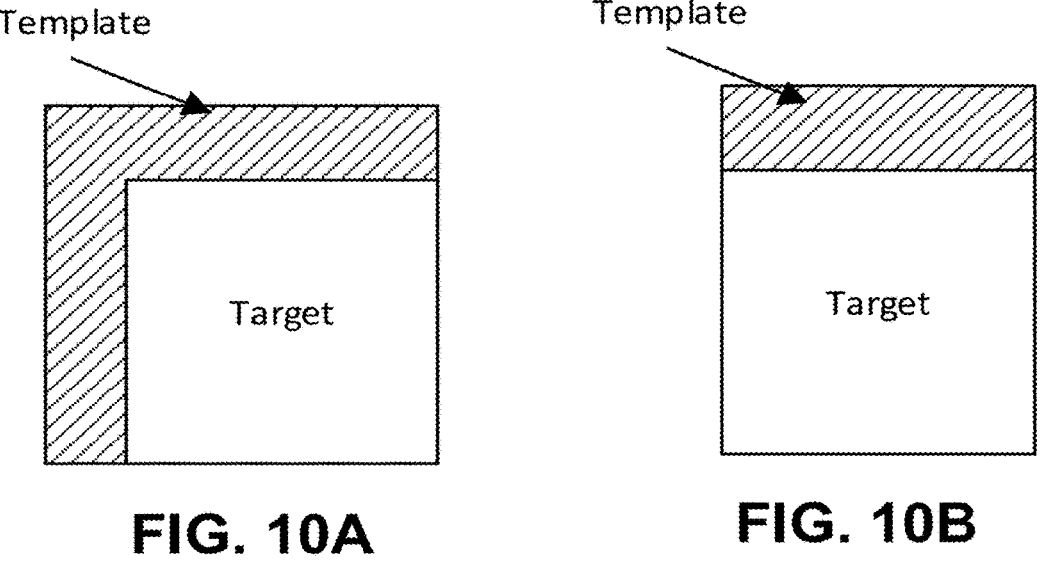
FIG. 10A          FIG. 10B
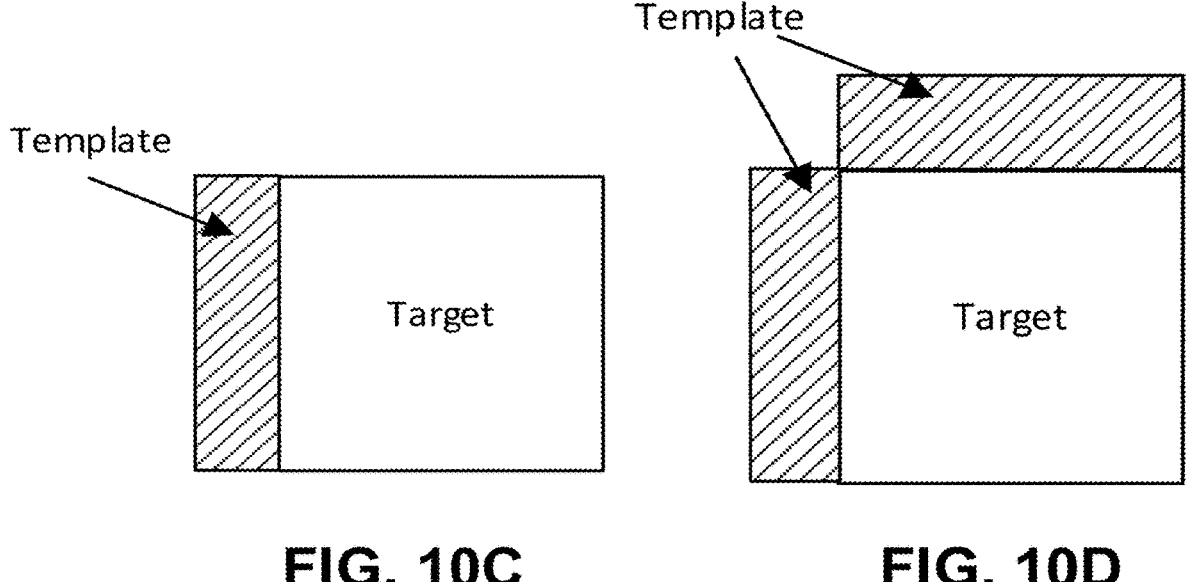
FIG. 10C          FIG. 10D

(continued in FIG. 11C)

COMMUNICATION INTERFACE 1219

TRANSCEIVER 1220

1202

SPEAKER/ MICROPHONE 1224

KEYPAD 1226

DISPLAY/ TOUCHPAD 1228

NON-REMOVABLE MEMORY 1230

PROCESSOR 1218

POWER SOURCE 1234

GPS CHIPSET 1236

PERIPHERALS 1238

REMOVABLE MEMORY 1232

COMMUNICATION INTERFACE 1392

PROCESSOR 1394

INSTRUCTIONS 1397

DATA STORAGE 1396

NETWORK ENTITY 1390

Bitstream 1400

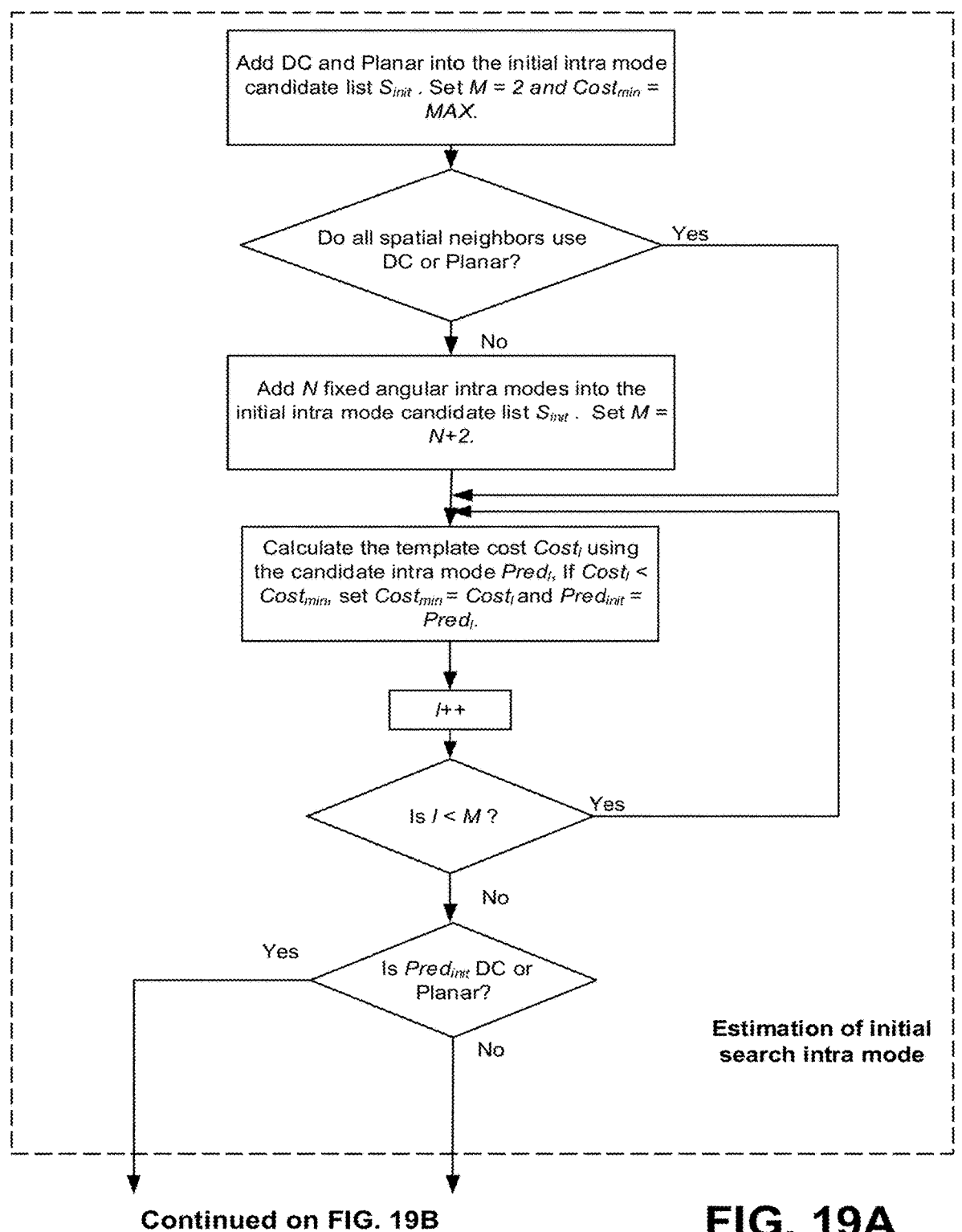

Add DC and Planar into the initial intra mode candidate list $S_{init}$. Set $M = 2$ and $Cost_{min} = MAX$.

Do all spatial neighbors use DC or Planar?                    Yes

No

Add $N$ fixed angular intra modes into the initial intra mode candidate list $S_{init}$. Set $M = N+2$.

Calculate the template cost $Cost_i$ using the candidate intra mode $Pred_i$. If $Cost_i < Cost_{min}$, set $Cost_{min} = Cost_i$ and $Pred_{init} = Pred_i$.

$I++$

Is $I < M$?                    Yes

No

Yes          Is $Pred_{init}$ DC or Planar?

No

Estimation of initial search intra mode

METHOD AND SYSTEM FOR DECODER-SIDE INTRA MODE DERIVATION FOR BLOCK-BASED VIDEO CODING

CROSS-REFERENCE TO RELATED APPLICATIONS

This application is a continuation of U.S. application Ser. No. 18/206,918, filed Jun. 7, 2023, which is a continuation application of U.S. application Ser. No. 16/096,236, filed Oct. 24, 2018, which is a National Stage Entry under 35 U.S.C. § 371 of International Application No. PCT/US2017/031303, filed on May 5, 2017, which claims benefit under 35 U.S.C. § 119 (c) from the following U.S. Provisional Patent Applications: Ser. No. 62/332,871, filed May 6, 2016; Ser. No. 62/335,512, filed May 12, 2016; and Ser. No. 62/367,414, filed Jul. 27, 2016, all of which are incorporated herein by reference in their entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Recently, both VCEG and MPEG started the exploration work of new coding technologies for future video coding standardization. In October 2015, ITU-T VECG and ISO/IEC MPEG formed the Joint Video Exploration Team (JVET) to begin significant study of advanced technologies that could enable substantial enhancement of coding efficiency over HEVC. In the same month, one software codebase, called Joint Exploration Model (JEM) was established for future video coding exploration work. The JEM reference software was based on HEVC Test Model (HM) that was developed by JCT-VC for HEVC. Any additional proposed coding tools need to be integrated into the JEM software, and tested using JVET common test conditions (CTCs).

SUMMARY

In the present disclosure, systems and methods are described for template-based decoder-side intra mode derivation (DIMD). The disclosed systems and methods reduce intra prediction parameter signaling overhead by harnessing computational capacity of the decoder. In disclosed embodiments, intra prediction modes are determined using a template-based algorithm at both the encoder and decoder. In one embodiment, a flag may be signaled to indicate the usage of DIMD. In case the DIMD mode is selected, no intra mode needs to be signaled. The DIMD is also useful for error concealment with the intra prediction method.

In various embodiments, a template based algorithm may reduce intra mode signaling overhead, while also enabling derivation of the intra mode at any block level.

In various embodiments, the DIMD methods may increase the granularity of angular intra prediction, increasing the number of angular intra directions and capturing the directional edges in natural video accurately.

In various embodiments, DIMD searching algorithms may reduce encoder or decoder searching complexity while ensuring the majority of the DIMD gain.

In one exemplary method of encoding or decoding (collectively "coding") a video in a bitstream, the video comprises a plurality of frames, each frame comprising blocks of samples. For at least a current block, a plurality of candidate intra coding modes are tested by determining a cost of using each respective candidate mode to predict samples in a template region adjacent to the current block. Based on the cost, a derived intra coding mode is selected from the plurality of candidate intra coding modes. The samples in the current block are predicted with intra prediction using the derived intra coding mode.

In some embodiments, the cost is a measure of distortion between the template region and a prediction of the template region using the respective candidate intra coding mode.

In some embodiments, determining the cost of a candidate intra coding mode is performed as follows. The respective candidate intra coding mode is used to generate a prediction of the template region from a set of reconstructed reference samples, and distortion is measured between the template region and the prediction of the template region. The template region may include reconstructed samples adjacent to the current block.

In some embodiments, a flag is signaled on a block-by-block basis indicating whether decoder-side intra mode derivation is used for the current block. The level at which the flag is signaled may be different for different embodiments.

In some embodiments, the candidate intra coding modes include candidate modes selected from among modes used for intra coding of blocks neighboring the current blocks (spatial neighboring blocks and/or temporal neighboring blocks). In some embodiments, the candidate intra coding modes further include modes within a predetermined range of at least one of the modes used for intra coding of neighboring blocks.

In some embodiments, at least some blocks in the video are predicted using a predetermined set of explicitly-signaled intra modes. The candidate intra modes used for DIMD prediction may have a finer granularity than the predetermined set of explicitly-signaled intra modes, such that there is a smaller angle between adjacent prediction directions used for DIMD prediction than for explicitly-signaled intra modes.

In some embodiments, determining the cost of using each of a plurality of candidate intra coding modes may be performed using a multi-stage search. In some such embodiments, the multi-stage includes an initial stage in which the cost is determined for each of an initial set of candidate modes. The modes in the initial set are separated by an initial interval. In at least one subsequent stage, a subsequent set of candidate modes is selected based on the candidate mode in the previous stage having the lowest cost. The modes in the subsequent set are separated by a subsequent interval smaller than the interval used in the previous stage.

In some embodiments, the selected derived mode is included in a list of most probable modes. An index may be coded in the bitstream identifying the selected derived mode from the list of most probable modes.

In some embodiments, prediction residuals for the samples in the current block are coded in the bitstream using a transform coefficient scanning order, and the transform coefficient scanning order is independent of the selected derived mode. For example, the transform coefficient scanning order may be a predetermined scanning order or the transform coefficient scanning order may be based on intra modes of spatial neighbors of the current block.

Video encoders and decoders configured to perform DIMD are also described.

Systems and methods herein provide novel techniques for prediction of sample values. Such techniques can be used by both encoders and decoders. Prediction of a sample results in a sample value that, in an encoding method, can be subtracted from an original sample input value to determine a residual that is encoded in the bitstream. In a decoding method, a residual can be decoded from the bitstream and added to the predicted sample value to obtain a reconstructed sample that is identical to or approximates the original input pixel. Prediction methods as described herein thus improve the operation of video encoders and decoders by decreasing, in at least some implementations, the number of bits required to encode and decode video. Further benefits of exemplary prediction methods to the operation of video encoders and decoders are provided in the Detailed Description.

BRIEF DESCRIPTION OF THE DRAWINGS

A more detailed understanding may be had from the following description, presented by way of example in conjunction with the accompanying drawings, wherein:

FIG. 6 depicts an exemplary diagram of position dependent intra prediction combination.

FIGS. 10A-10D depict exemplary embodiments of the DIMD template layout, wherein FIG. 10A illustrates an exemplary L-shape template; FIG. 10B illustrates an exemplary template using above neighboring samples; FIG. 10C illustrates an exemplary template using left neighboring samples; and FIG. 10D illustrates an exemplary template using both above and left neighboring samples.

FIGS. 19A and 19B depict an exemplary flowchart for one embodiment of a multi-stage DIMD searching algorithm with early termination.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (e.g., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary Block-Based Encoding and Decoding Systems and Methods.

Embodiments disclosed herein, like the HEVC and JEM software, are built upon a block-based hybrid video coding framework.

Figure 1:
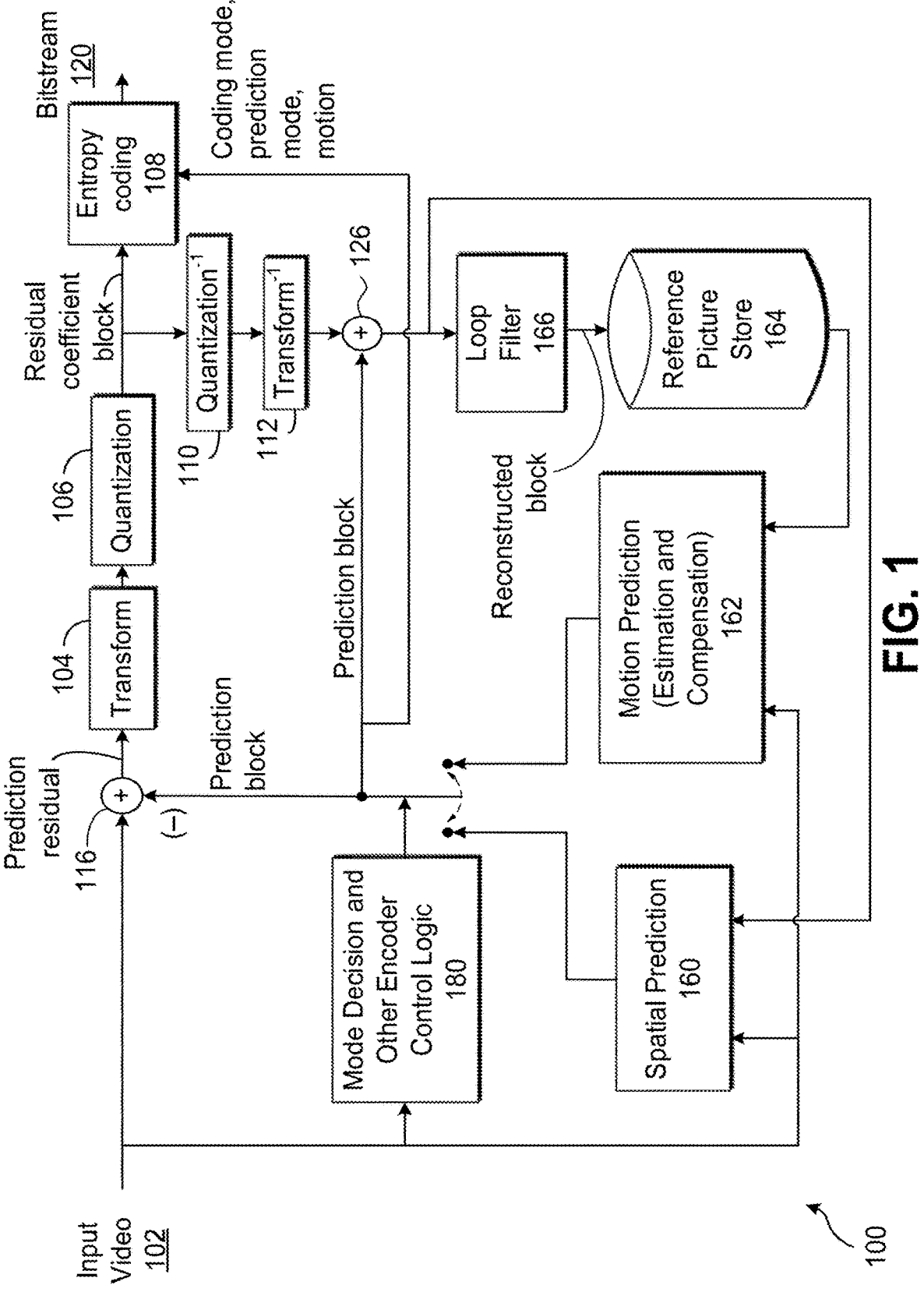
FIG. 1 depicts an example of a general block diagram of video encoder.

FIG. 1 is a functional block diagram of a block-based hybrid video encoding system. The input video signal 102 is processed block by block. In HEVC, extended block sizes (called a "coding unit" or CU) are used to efficiently compress high resolution (1080p and beyond) video signals. In HEVC, a CU can be up to 64×64 pixels, and bigger block size up to 256×256 is allowed in JEM. A CU can be further partitioned into prediction units (PU), for which separate prediction methods are applied. For each input video block (MB or CU), spatial prediction (160) and/or temporal prediction (162) may be performed. Spatial prediction (or "intra prediction") uses pixels from the already coded neighboring blocks in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is sent additionally; and the reference index is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106) to achieve the target bit-rate. The quantized residual coefficients are inverse quantized (110) and inverse transformed (112) to form the reconstructed residual, which is then added back to the prediction block (126) to form the reconstructed video block. Further in-loop filtering such as de-blocking filter and Adaptive Loop Filters may be applied (166) on the reconstructed video block before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Figure 2:
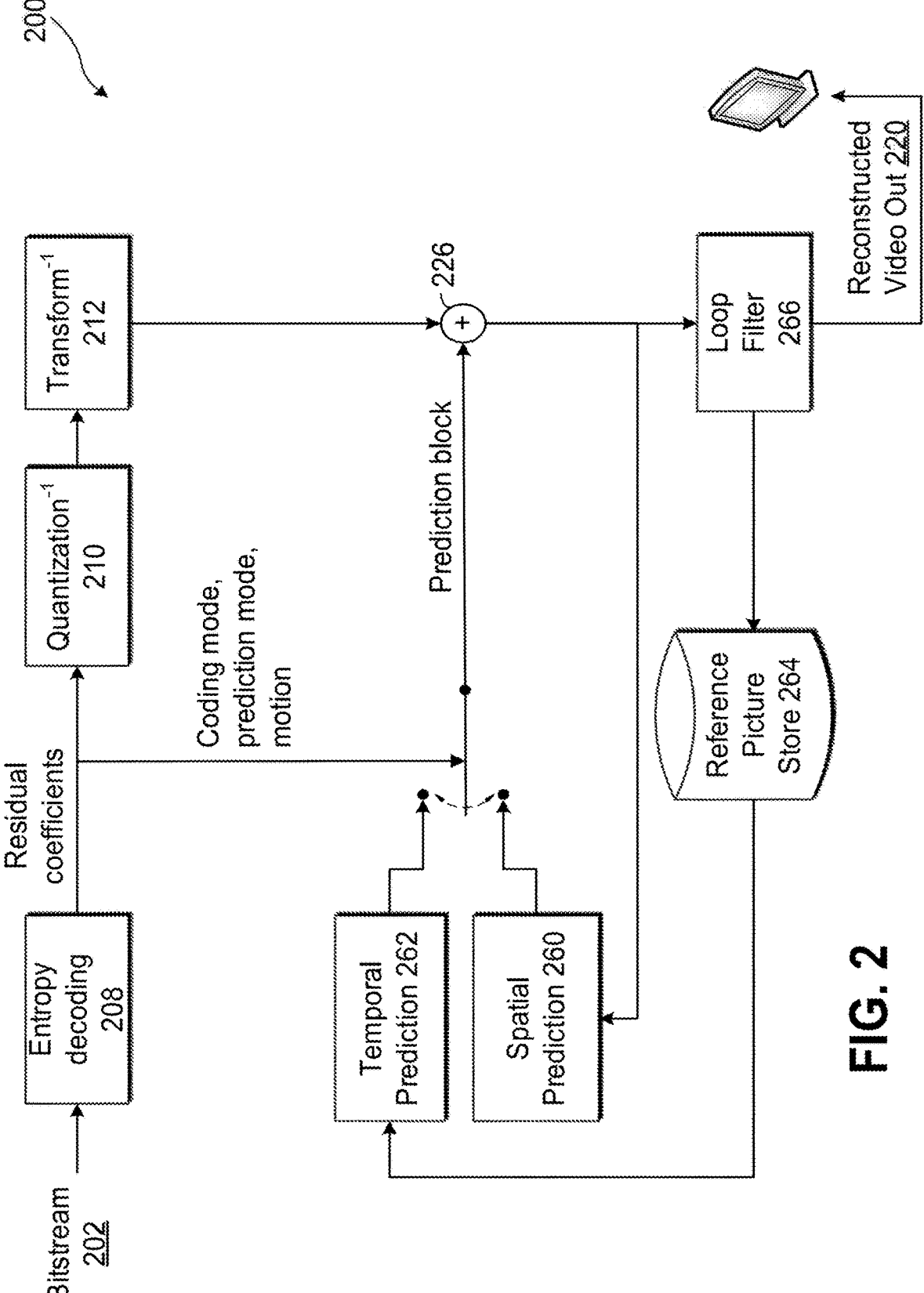
FIG. 2 depicts an example of a general block diagram of a video decoder.

FIG. 2 is a functional block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video 220 is sent out to drive a display device, as well as used to predict future video blocks.

Intra Coding Tools in HEVC.

HEVC incorporates several coding tools that improve the efficiency of intra prediction over preceding video coding standards. Those intra coding tools can more accurately model different directional texture as well as smooth regions with gradually changing sample values. Moreover, additional efforts were also made during the design to avoid the introduction of artificial edges with potential blocking artifacts by doing adaptive smoothing of reference samples and the boundary samples of the generated intra prediction for DC and directly horizontal and vertical directions.

The coding structure utilized for intra coding of HEVC closely follows the overall structure of the codec. Specifically, one picture is split into a number of CUs which represent the basic quad-tree splitting regions that are used to conduct intra coding. Inside one CU, multiple nonoverlapping prediction units (PUs) can be defined, each of which specifies a region with individual intra prediction mode. In HEVC, one intra-coded CU may have two types of PU partitions, namely, PART_2N×2N and PART_N×N. PART_2N×2N indicates that all the samples in the CU are predicted by the same intra prediction mode and PART_N×N indicates that the CU is split into four equal size PUs each of which is predicted by its own intra prediction mode. A given PU can be further split into quad-tree of transform units (TUs), each of which is the basic operational unit of applying residual coding with a transform with the size of the TU. Additionally, in the HEVC specification, the prediction operations of all intra prediction modes in HEVC are defined on the TU basis to minimize the distance between predicted samples and reference samples used in prediction for improved efficiency of intra prediction.

Due to the number of possible intra prediction modes, HEVC considers five Most Probable Modes (MPMs) when coding luma intra prediction modes. Among the five MPMs, the first two are derived by detecting the intra prediction modes of the above and left neighboring blocks and the remaining three MPMs are defined as Planar, DC and vertical direction (26). Additionally, in cases where both above and left blocks have the same angular mode, two neighboring angular directions closest to that direction will also be included in the MPM list.

Figure 3:
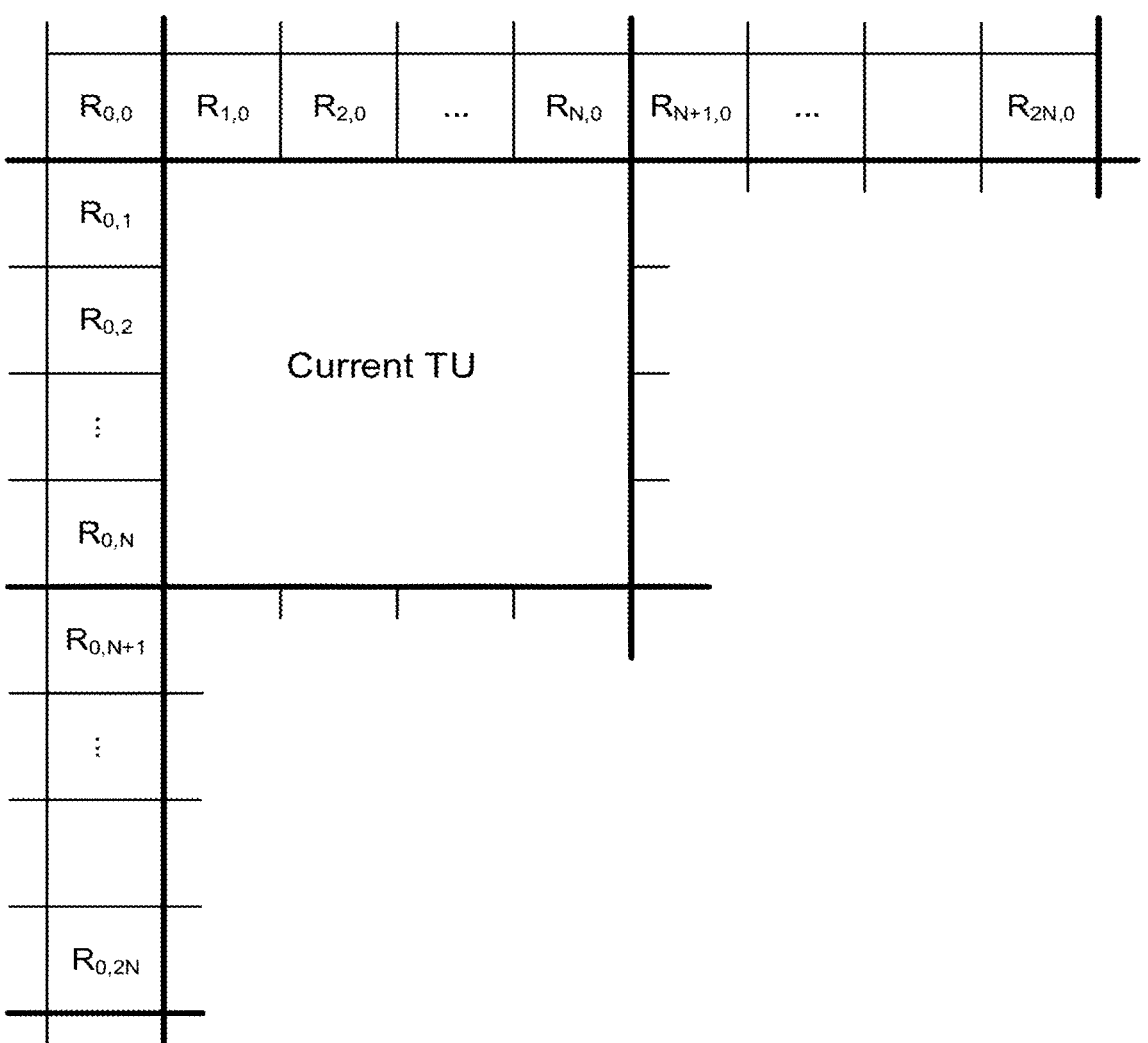
FIG. 3 depicts an example of the reference samples used in HEVC intra prediction.
Figure 4:
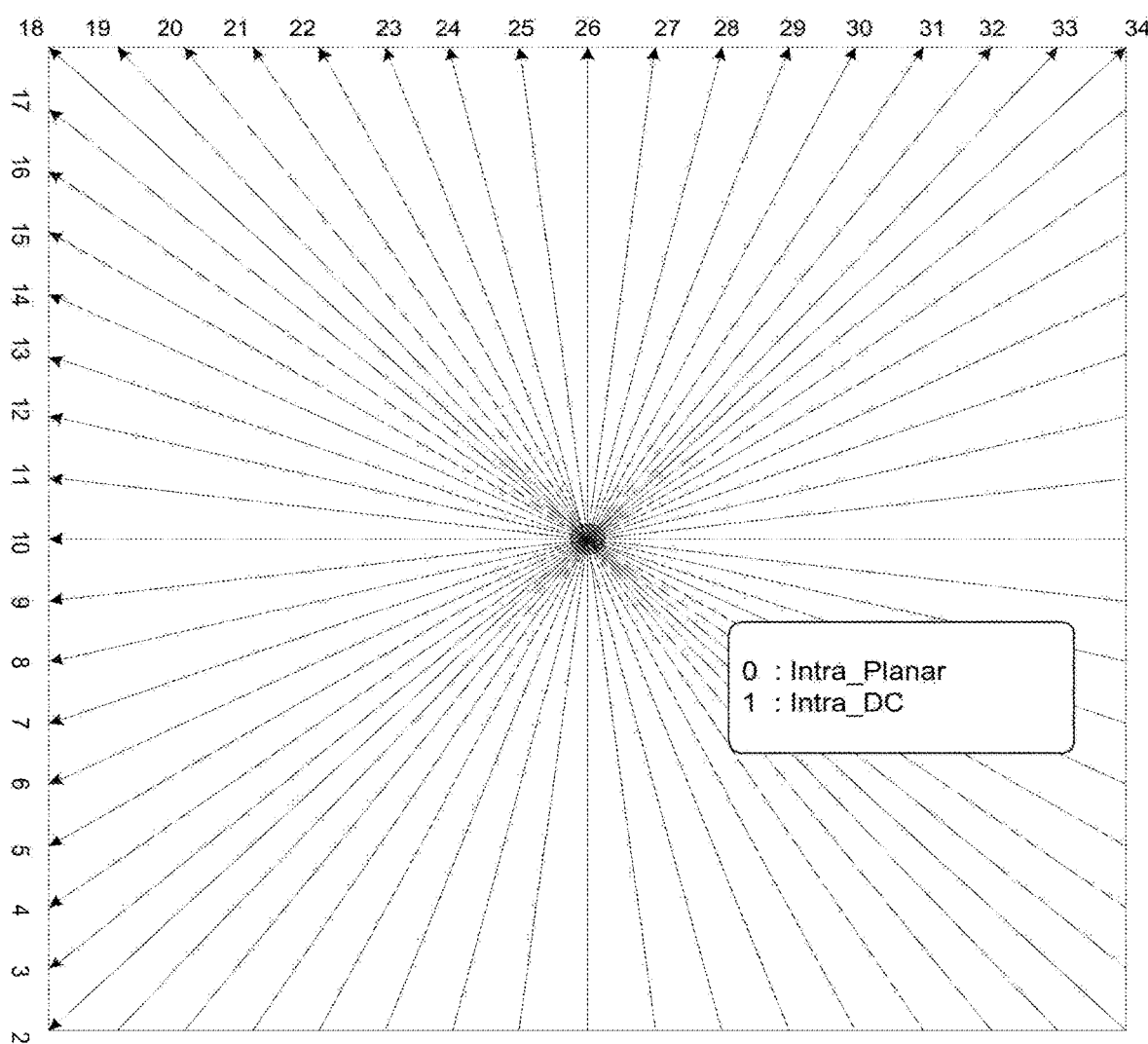
FIG. 4 depicts an example of the indication of intra prediction directions in HEVC.

Intra prediction modes. For all intra prediction modes in HEVC, the same set of previously decoded boundary samples from above and to the left of the current TU (as shown in FIG. 3) are used for prediction. Directional prediction with 33 different angular orientations are defined for various TU sizes ranging from 4×4 to 32×32. In addition to angular directions, planar prediction (which assumes a gradual changing surface with horizontal and vertical slope derived from boundaries) and DC prediction (which assumes a flat surface) can also be used. Table 1 specifies the mode index and intra prediction modes associated with each mode index. FIG. 4 illustrates the existing intra prediction modes as defined in HEVC. For chroma, the horizontal, vertical, planar and DC modes can be explicitly signaled in bitstream; additionally, chroma prediction mode can be indicated to be the same as luma prediction mode through DM mode.

TABLE 1

| Specification of intra prediction modes. | |
| --- | --- |
| Index | Intra Prediction Mode |
| 0 | Planar |
| 1 | DC |
| 2 . . . 34 | Angular(N), N = 2, 3, . . . , 34 |

Reference sample smoothing. In HEVC, reference samples used for intra prediction are sometimes filtered by a 3-tap smoothing filter [1, 2, 1]/4, depending on TU size and the directionality of intra prediction. For 32×32 TUs, all angular modes except for direct horizontal and vertical use filtered reference samples. For 16×16 TUs, the intra modes that do not use filtered reference samples are extended to four modes (9, 11, 25 and 27) closest to horizontal and vertical. For 8×8 and smaller TUs, only diagonal modes (2, 18 and 34) use filtered reference for prediction. Additionally, reference smoothing is also applied to planar mode when the TU size is 8×8 or larger.

Boundary smoothing. To remove the discontinuities along TU boundaries, for three intra modes (DC, horizontal and vertical), the boundary samples along the intra prediction block are replaced by filtered samples from a 2-tap smoothing filter [3, 1]/4. Specifically, the prediction samples in the first row and the first column are filtered when DC mode is applied. The first prediction column for direct vertical mode and the first prediction row for direct horizontal mode are filtered.

Intra coding tools in JEM. In general, the basic structure of HEVC intra coding remains unchanged in JEM with several modules associated with intra predictions being further extended and/or improved, including extended intra prediction directions, 4-tap intra interpolation, extended boundary smoothing, position-dependent intra prediction combination, mode-dependent non-separable secondary transform and adaptive reference filtering. In the following, several intra coding tools in JEM are briefly reviewed.

Figure 5:
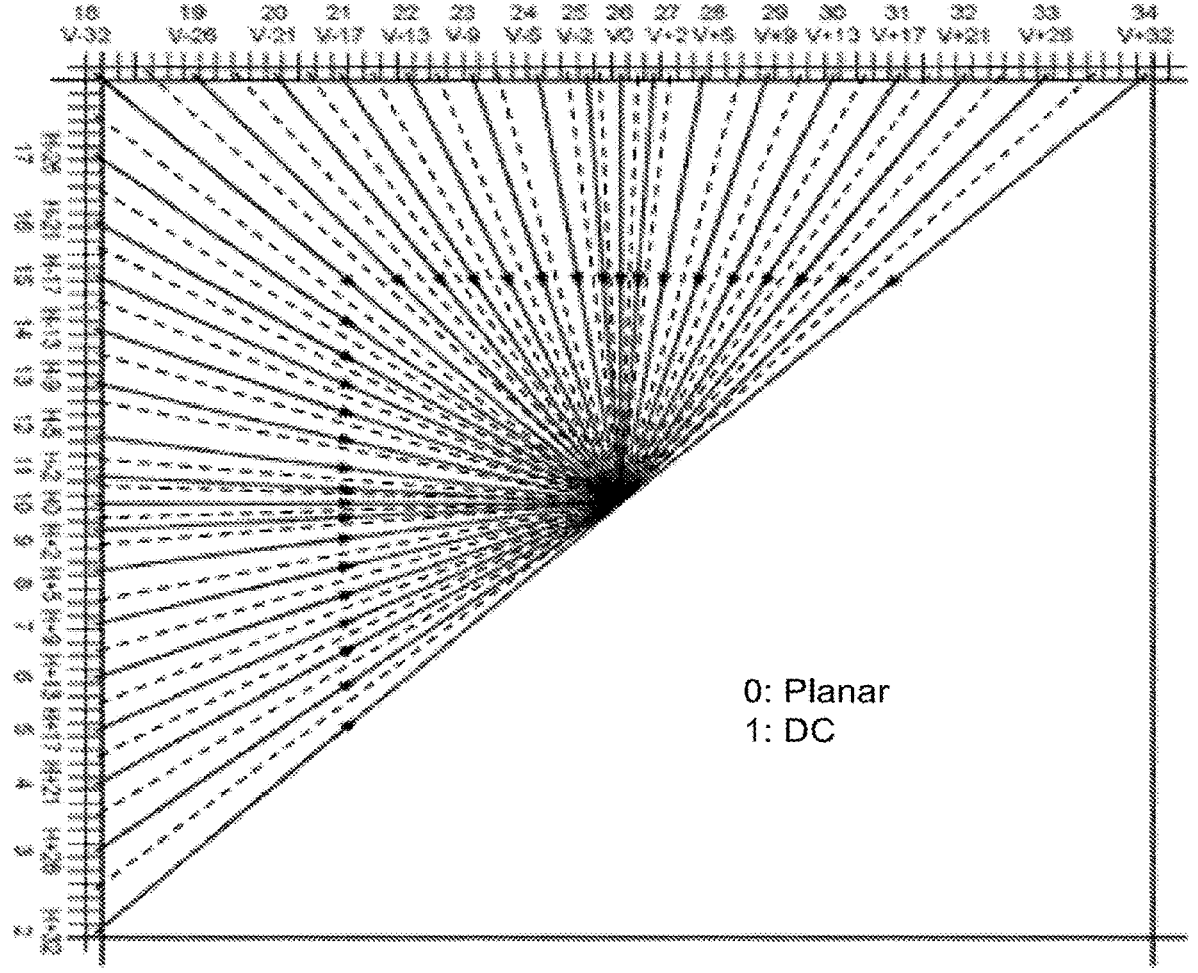
FIG. 5 depicts an example of the indication of intra prediction directions in JEM.

Extended intra prediction directions. To capture finer edge directions present in natural videos, in JEM, the number of the angular intra prediction modes is extended from 33 in HEVC to 65. FIG. 5 illustrates the intra prediction modes as defined in JEM where the new directional modes over HEVC are highlighted as dotted lines and the Planar and DC modes remain the same. Like in HEVC, the extended directional intra prediction modes apply for all TU sizes and both luma and chroma intra predictions.

To accommodate the increased number of directional intra modes, an improved intra mode coding method uses six MPMs. To derive the set of six MPMs, the intra modes of the left and above neighboring blocks are checked. Instead of using the intra modes from top and left neighboring blocks directly as in HEVC, the most frequently used intra mode along the top neighboring row and along the left neighboring column are computed, and then used as the left and above neighboring modes, respectively. Next, to derive the actual 6 MPMs, the same rule used in HEVC is firstly applied to obtain 3 MPMs; then, the remaining 3 MPMs are defined as the 3 intra modes closest to (in terms of prediction direction) the angular modes which have already been included in the list of MPMs. Table 2 specifies the MPM derivation method currently used in JEM, where L and A specify the most frequently used intra prediction mode of the left and above neighboring blocks, respectively, and Max and Min specify the maximum and the minimum of the intra prediction modes of the left and the above neighboring blocks, respectively.

extended to the four modes (9, 11, 25, 27) closest to horizontal and vertical; for 8×8 blocks, only the diagonal modes (2, 18, 34) use a filtered reference. Smoothing is also applied where the planar mode is used, for block sizes 8×8 and larger.

Applying reference sample smoothing selectively based on the block size and directionality of the prediction may reduce contouring artifacts caused by edges in the reference sample arrays. In JEM, in order to improve intra prediction efficiency, two sets of low-pass filters as below are applied by reference sample adaptive filtering (RASF) to smooth reference samples for intra prediction.

3-tap LPF with the coefficients of [1, 2, 1]/4, (default reference smoothing filter of HEVC), 5-tap LPF with the coefficients of [2, 3, 6, 3, 2]/16.

In order to maximize the gain that RSAF could achieve, the selection of two reference smoothing filters are performed on TU-level.

Data hiding is a technique mainly used for watermarking. In HEVC, this method is applied to hide the signs of the most significant coefficients of TU's coefficients groups (CGs) into the parity of absolute values of CG's coefficients, which is referred to as sign bits hiding (SBH). To reduce the overhead of RSAF flag signaling, data hiding is used to hide the flag that indicates whether the reference filtering is enabled for a given TU into the transform coefficients of that TU. In contrast to the SBH, which uses all the coefficient in a given TU, RSAF only uses those transform coefficients located at odd positions within the TU to hide a value of the filtering flag.

Position dependent intra prediction combination. In HEVC, intra prediction is computed from either a nonfiltered or a filtered set of reference border pixels, depending on the predictor mode and block size. The position dependent intra prediction combination (PDPC) extends this method by employing weighted combinations of filtered references and prediction samples calculated from unfiltered references, where the weights depend on prediction mode and pixel position. Based on the notation used to define the intra predictors as shown in FIG. 6, r and s represent the unfiltered and filtered reference samples, respectively. q[x,

TABLE 2

Derivation of 6 MPMs in JEM.

| | Conditions | | MPM0 | MPM1 | MPM2 | MPM3 | MPM4 | MPM5 |
|---|---|---|---|---|---|---|---|---|
| L = A | L ≠ Planar and L ≠ DC | | L | Planar | L + 1 | L − 1 | L + 2 | DC |
| | Otherwise | | Planar | DC | 26 (Ver) | 10 (Hor) | 2 | 18 |
| L ≠ A | L ≠ Planar and | L = DC or A = DC | L | A | Planar | Max − 1 | Max + 1 | Max + 2 |
| | R ≠ Planar | otherwise | L | A | Planar | DC | Max + 1 | Min − 1 |
| | otherwise | L + A < 2 | L | A | 26 (Ver) | 10 (Hor) | 2 | 18 |
| | | otherwise | L | A | DC | Max − 1 | Max + 1 | Max + 2 |

Reference sample adaptive filtering. In HEVC intra prediction, a low-pass filter [1, 2, 1]/4 is used to smooth reference samples for some intra prediction modes. The number of the intra prediction modes to which smooth filtering is applied depends on the block size and prediction mode. Specifically, for 32×32 blocks, all angular modes except horizontal and vertical use a filtered reference; for 16×16 blocks, the modes not using a filtered reference are y] is the directional prediction derived from the filtered reference s as defined in HEVC but disabling boundary filters for DC, and direct horizontal and vertical intra directions. The values x and y are the horizontal and vertical distance from the block boundary. Using ">>" to represent right bit-shift operation, the new prediction p[x, y], which combines weighted values of unfiltered reference samples r[x, y] with the prediction signal q[x, y], is derived as $$p[x, y] = \tag{1}$$

$$\{(c_1^{(v)} \gg \lfloor y/d \rfloor)r[x, -1] - (c_2^{(v)} \gg \lfloor y/d \rfloor)r[-1, -1] + (c_1^{(h)} \gg \lfloor x/d \rfloor)$$

$$r[-1, y] - (c_2^{(h)} \gg \lfloor x/d \rfloor)r[-1, -1] + b[x, y]q[x, y] + 64\} \gg 7$$

where $$c_1^v, c_2^v, c_1^h, c_2^h$$

are predefined prediction parameters, d=1 for block sizes up to 16×16, and d=2 for larger blocks, and $$b[x, y] = \tag{2}$$

$$128 - (c_1^{(v)} \gg \lfloor y/d \rfloor) + (c_2^{(v)} \gg \lfloor y/d \rfloor) - (c_1^{(v)} \gg \lfloor y/d \rfloor) + (c_2^{(h)} \gg \lfloor y/d \rfloor)$$

is a normalization factor.

The filtered reference is derived by using binomial low-pass filters, since they can be easily adjusted for integer computations, and approximate Gaussian filters. The prediction parameters $$(c_1^v, c_2^v, c_1^h, c_2^h)$$

and lowpass filter parameters are defined per prediction direction (neighboring prediction directions are grouped into 35 pairs) and block size. For each of 35 prediction direction pairs for a given block, 3 sets of prediction parameters and lowpass filters are predefined. The selected one from these 3 sets is signaled on the CU level.

Mode-dependent non-separable secondary transform. Due to the fact that the correlation between spatial neighboring samples is much less than that in temporal domain, there are usually strong correlation within the residual samples generated from intra prediction. In order to further improve intra coding efficiency, mode-dependent non-separable secondary transform (NSST) is applied in the current JEM. NSST applies non-separable transforms to each 4×4 transform coefficient block of intra prediction. Specifically, a CU-level index, valued from 0 to 3, is explicitly signaled to identify which pre-defined secondary transform is applied. If the index is zero, secondary transform is not used; otherwise, one of the three pre-defined 4×4 non-separable transforms is used. For each 4×4 coefficient block of one TU, the 4×4 non-separable transform identified by the CU-level index is applied. Additionally, the CU-level NSST flag is signaled only when there is at least one non-zero transform coefficient in the current CU.

To apply the non-separable transform, one 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \tag{3}$$

is first rearranged into a vector $\vec{X}$:

$$\vec{X} = \tag{4}$$

$$[X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal).

Cross component prediction for chroma intra prediction. Coding performance can be improved by exploring the cross component correlation. In JEM the cross-component Linear Model (LM) prediction mode is used for chroma intra prediction. In LM prediction mode, the chroma samples are predicted based on reconstructed luma samples of the same block by using a linear model as follows:

$$pred_C(i, j) = \alpha \cdot rec_L(i, j) + \beta \tag{5}$$

where $pred_C(i,j)$ represents the prediction of chroma samples in a block and $rec_L(i,j)$ represents the reconstructed luma samples of the same block in the same resolution as chroma block, which may be down sampled for 4:2:0 chroma format content. Parameters $\alpha$ and $\beta$ are derived by minimizing regression error between the neighboring reconstructed luma and chroma samples around the current block.

Additionally, the LM prediction mode also exploits the correlation between two chroma components, i.e. Cr component is predicted from Cb component. Instead of using the reconstructed sample signal, the cross component prediction is applied in residual domain. This is implemented by adding a weighted reconstructed Cb residual to the original Cr intra prediction to form the final Cr prediction:

$$pred_{Cr}^*(i, j) = pred_{Cr}(i, j) + \alpha \cdot resi_{Cb}'(i, j) \tag{6}$$

The scaling factor $\alpha$ is derived in the same way as the derivation of parameters $\alpha$ and $\beta$ described above. The only difference is an addition of a regression cost relative to a default $\alpha$ value in the error function so that derived scaling factor is biased towards the default value (−0.5).

In existing video coding standards, intra prediction parameters are determined by the video encoder and explicitly transmitted in video bit-stream. Therefore, for intra-coded blocks, a significant amount of bit-rate is spent on the coding of the intra prediction parameters.

In contrast to the video decoder, the encoder has access to the original video signal and therefore is able to quantify the distortion associated with the specific intra prediction parameter. This enables the encoder to optimize the intra prediction parameters such that the overall distortion is minimized at a given bit-rate constraint. This process of rate-distortion (R-D) optimization, which typically involves the calculation of prediction distortion and signaling overhead of all possible intra prediction modes, is typically a computation intensive work. Due to the rapidly increasing computational resources in modern devices, even battery-powered devices are able to implement sophisticated algorithms at the decoder. For example, recent studies have shown that motion estimation at the decoder can provide significant coding gain. Since motion estimation is conducted at the decoder, transmission of motion vectors (MVs) can be omitted.

Block-Based Video Coding Framework with DIMD.

In some embodiments, decoder-side intra mode derivation (DIMD) is used. DIMD may reduces the signaling overhead of the intra prediction mode. Instead of signaling the intra prediction mode explicitly, the mode is derived implicitly at the decoder side. If the derivation is accurate, no intra prediction direction information needs to be coded into bit-stream and compression efficiency is improved. However, the derived intra mode may not always be accurate enough. To avoid large prediction errors and to improve the coding performance, the DIMD mode may be adaptively selected at certain block level by performing an R-D optimization decision in a way similar to the Lagrangian optimization method which is used in HM and JEM. Specifically, in one embodiment, an additional flag derive_intra_prediction_mode_flag may be used to transmit the encoder decision to the decoder, indicating whether the current block is predicted using an intra prediction mode derived from DIMD or using an intra prediction mode explicitly signaled in the bit-stream.

Figure 7:
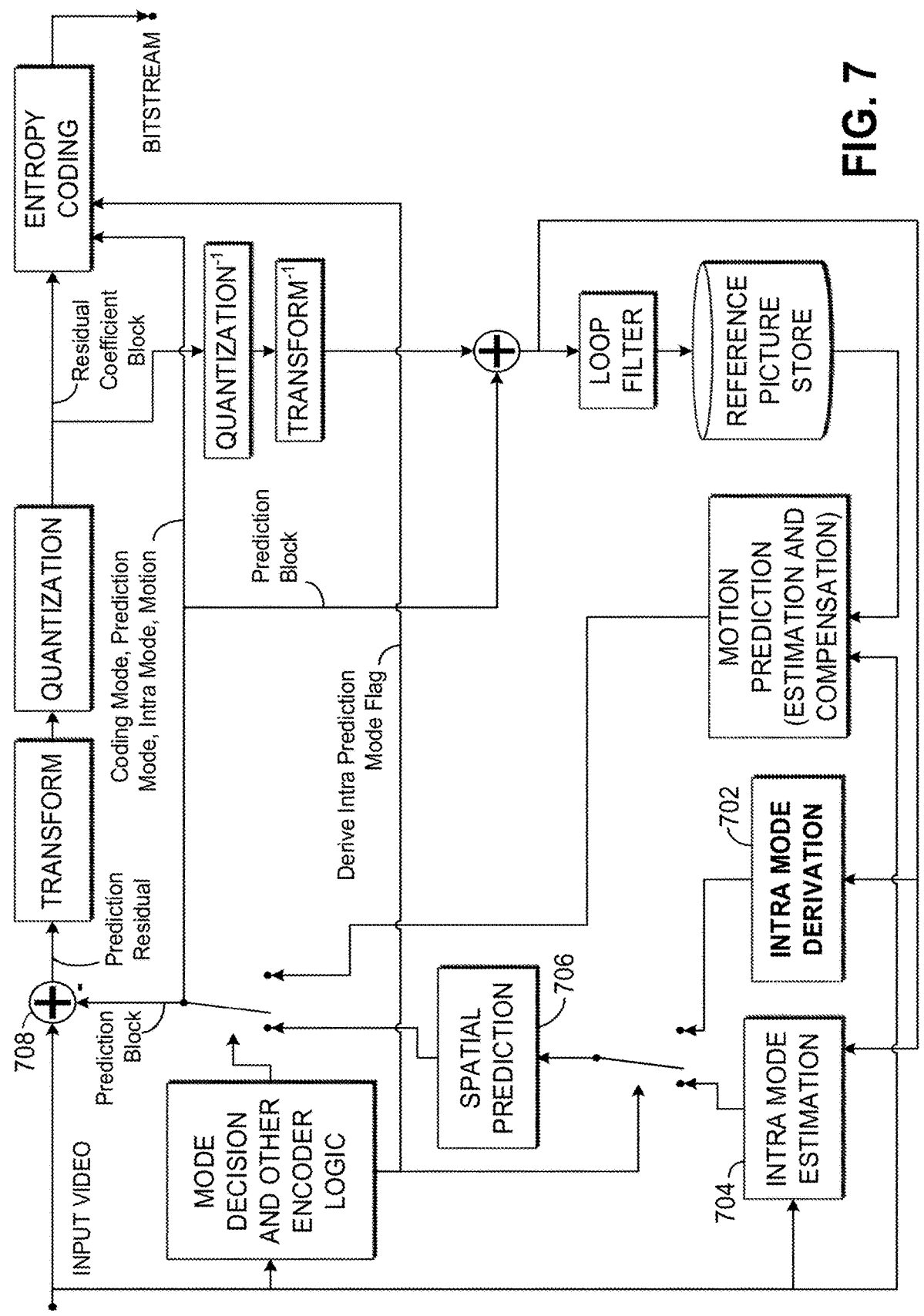
FIG. 7 depicts an exemplary block diagram of a hybrid video encoder including a DIMD module.

FIG. 7 shows an exemplary diagram of a hybrid video encoder with a decoder-side intra mode derivation (DIMD) module 702. In one embodiment, firstly, for intra-coded blocks, the encoder estimates the intra prediction mode by either conventional R-D based intra mode estimation methods (block 704) or the DIMD methods. Then, similar to the existing video encoder (as shown in FIG. 1), the intra (or spatial) prediction module 706 generates the intra prediction signal by predicting the samples of the current block from its adjacent reconstructed samples belonging to neighboring block. Then, the original signal is subtracted from the intra prediction signal (at 708) to remove spatial redundancy and produce the corresponding residual signal. The transform and quantization are applied to the residual signal which are then entropy-coded and output to the bit-stream. To obtain the reconstructed signal, the reconstructed residual signal is made available by inverse quantization and inverse transform. Then, the reconstructed residual is added to the prediction signal. Further, in some embodiments, in-loop filtering processes, e.g., de-blocking, ALF and SAO, are applied to the reconstructed video signal for output. As mentioned above, to maximize the coding gain of DIMD, a flag such as exemplary derive_intra_prediction_mode_flag may be signaled at a given block level (e.g., CU, PU, or TU level) to indicate whether the DIMD algorithm is applied to derive the intra prediction mode of the current block (e.g., indicating no need to transmit the intra prediction mode, reducing overhead).

Figure 8:
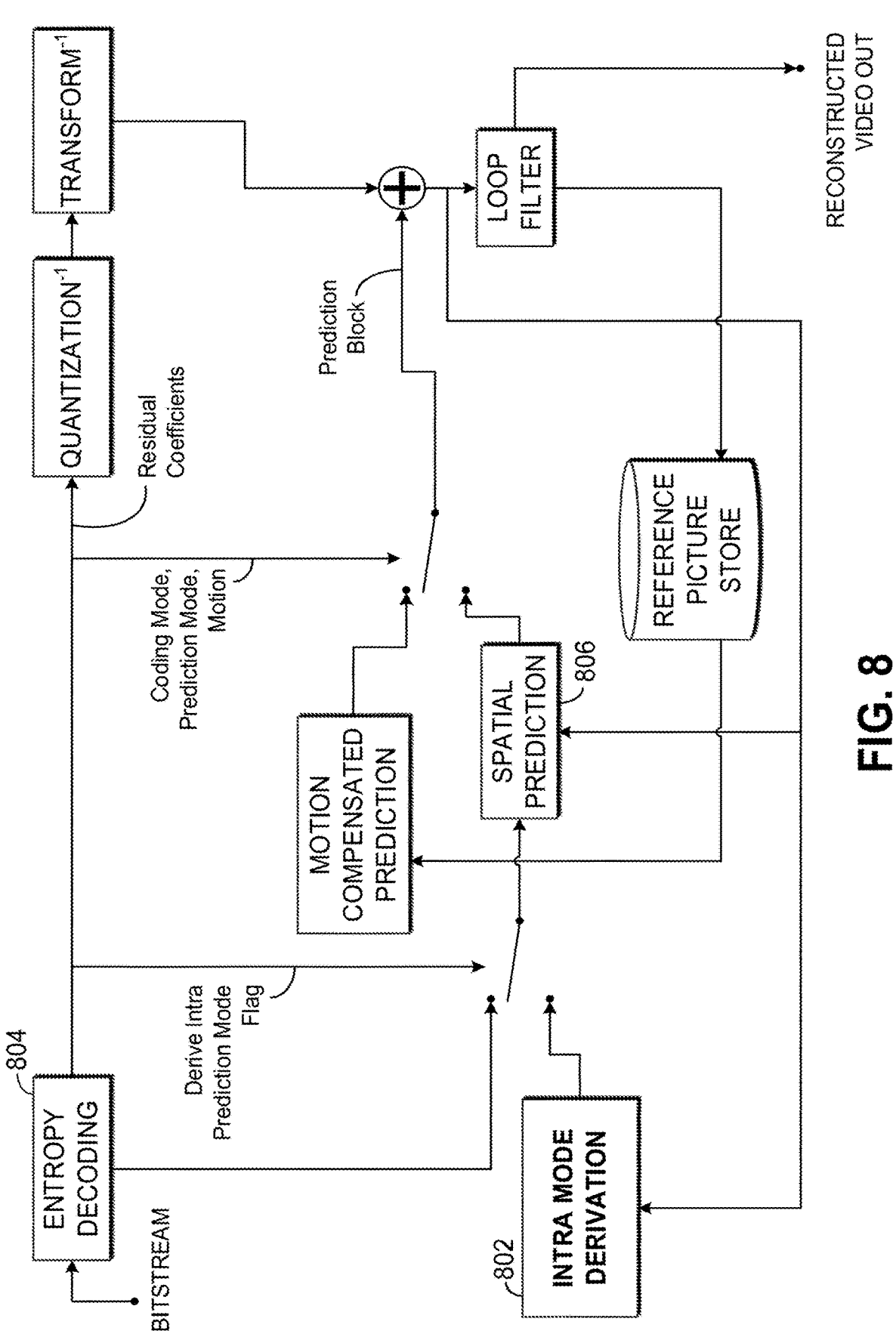
FIG. 8 depicts an exemplary block diagram of a hybrid video decoder including a DIMD module.

FIG. 8 is an exemplary diagram of a hybrid video decoder with a DIMD module 802 that may receive a bit-stream produced by the exemplary encoder shown in FIG. 7. In one embodiment, at the decoder, the bit-stream may be first parsed by the entropy decoder 804. The residual coefficients are then inverse quantized and inverse transformed to obtain the reconstructed residual. The coding mode and prediction information are used to obtain the prediction signal using either spatial prediction or temporal prediction. For intra-coded blocks, if the derive_intra_prediction_mode_flag is true, the intra prediction mode is derived at the decoder by module 802; otherwise, the intra prediction mode is explicitly decoded from the bit-stream. Given the intra prediction mode, a prediction signal is generated by module 806 by predicting the samples of the current block from its adjacent samples. The prediction signal and the reconstructed residual are then added together to get the reconstructed video. Finally, the reconstructed video may additionally go through loop filtering before being stored in the reference picture store to be displayed and/or to be used to decode future video signal.

Below are set forth further elements of embodiments of the disclosed DIMD systems and methods which build upon the disclosed encoding and decoding processes shown in FIGS. 7 and 8.

Intra Mode Derivation Using Template.

Figure 9:
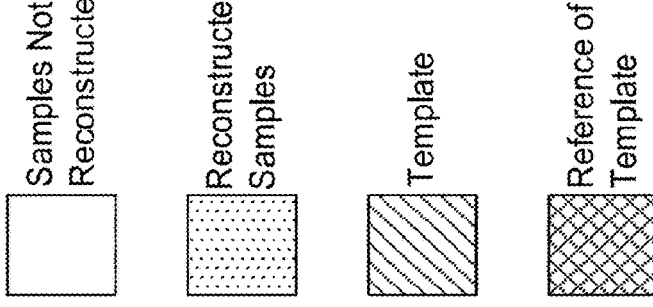
FIG. 9 depicts an exemplary embodiment of the relationship between target samples, template samples and the reference samples of template used in the DIMD methods disclosed herein.

FIG. 9 depicts an exemplary embodiment of the relationship between target samples, template samples and the reference samples of template used in an exemplary DIMD method. As illustrated in FIG. 9, the target is denoted as the current block (of block size N) for which the intra prediction mode is to be estimated. The template (indicated by diagonally-hatched region in FIG. 9) specifies a set of already reconstructed samples that are used to derive the aforementioned intra prediction mode. The template size is denoted as the number of samples within L-shaped region that extends to the top and the left of the target block by distance L. The reference of the template (indicated by the cross-hatched region in FIG. 9) refers to a set of neighboring samples from above and left of the template; for example, DIMD may use the same set of reference samples as defined by HEVC intra prediction. Unlike the template samples which are always from reconstructed region, the reference samples of template may not be reconstructed yet when encoding/decoding the target block. In this case, the reference samples substitution algorithm of HEVC may be utilized to substitute the unavailable reference samples with the neighboring available reference samples of the template.

The selection of template samples is restricted by the encoding/decoding order of blocks. In FIG. 9, the closest reconstructed samples to the target block, which forms one L-shaped region, are used as the template. In practice, templates with different shape and size may be selected, which provides various different complexity to performance trade-offs for the DIMD methods and systems. In the following discussion, the term "template size" refers to the number of samples that the template region extends to the left and the top of the target block, the number represented by L in FIG. 9. Though FIG. 9 shows the top and left template region to have the same size of extension, as indicated by the value L, in another embodiment of a DIMD method, different values of L, e.g. L1 and L2, may be used for the top and left template region. Choosing a large template size has the drawback that the samples of the template tend to be farther away from the target block. Therefore, the correlation between the template and the target block may be insufficient. Additionally, large template size also leads to increased encoding/decoding complexity, given that there are more template samples to be predicted during the DIMD process. On the other hand, large template size may also be advantageous in the sense that it can yield a more reliable estimation in the presence of noise (e.g., the video capture noise and the noise caused by the coding process). Therefore, it is beneficial to select the optimal template region for different block sizes, which should be large enough to be robust against noise while not exceeding a reasonable size limit to ensure sufficient correlation between template and the target block and reasonable complexity.

For comparable signaling overhead, coding using the DIMD mode is expected to permit accurate intra prediction with smaller block sizes since the intra direction does not need to be signaled in the bitstream for each block. Moreover, DIMD allows selection from among a greater number of different intra directions without incurring the overhead of signaling a greater number of directions. The smaller block sizes and finer granularity of intra prediction directions (i.e. a smaller angle between adjacent prediction directions) permits capturing directional edges in natural video more efficiently.

In one embodiment, a template size of 2 (i.e., L=2) is used for 4×4 and 8×8 blocks and a template size of 4 (i.e., L=4) is used for 16×16 and larger video blocks. In another embodiment, the template size may be adaptively selected based on analyzing the signal contained in the template. For example, initially a small template may be selected. Analysis is done to decide the noise level in the small template. If the noise level is high (e.g., above a threshold), then a larger template may be selected to perform DIMD. In addition to the template size, different template layout may also be applied to the DIMD method. FIGS. 10A-10D depict examples of different template layouts that may be applied for the DIMD method to estimate the intra prediction mode of the target block. For example, in some embodiments, the template layout may comprise: an L-shape template (FIG. 10A); a template using above neighboring samples (FIG. 10B); a template using left neighboring samples (FIG. 10C); and/or a template using both above and left neighboring samples (FIG. 10D).

In one embodiment, a DIMD method includes calculation for each intra prediction mode of the cost measured between the reconstructed template signal and the prediction signal obtained from the reference samples of the template. The template cost may be measured as the distortion between the two. Similar to other block-based matching schemes, different template cost measurements may be applied by the DIMD method, such as sum of absolute difference (SAD), sum of square difference (SSD) and sum of absolute transformed difference (SATD). The cost may also be measured as the sum of small sub-block unit (e.g., 2×2 or 4×4) contained in the template. The intra prediction mode that yields the minimum template cost will be selected as the optimal DIMD intra prediction mode of the target block. The optimal DIMD mode is then compared with the optimal mode from normal intra prediction (with explicitly signaled prediction mode), for example, using rate distortion optimization criterion or another criterion of the encoder's choice. If there is strong correlation between the target block and its template, the optimal DIMD mode is likely to provide a good estimate of the intra prediction mode of the adjacent target block.

In some embodiments, the intra mode derived by DIMD is used not only to improve the efficiency of intra coding by saving the overhead of signaling intra modes but also (or alternatively) to enhance the error concealment of the coding blocks coded with intra mode. For example, in response to detection that parts of the bit-stream which are related with the parsing of the intra modes are corrupted, the proposed DIMD method may be applied to provide an estimate of the original intra mode and ensure acceptable reconstruction quality of the intra-coded blocks for clients.

High-Accuracy Intra Prediction for DIMD.

In JEM, the number of the angular intra modes is 65. The number of 65 is selected in order to provide an increased intra prediction granularity without overwhelmingly increasing the signaling overhead of intra prediction mode which may neutralize the coding gain obtained from the increased intra prediction accuracy. Given that the intra prediction mode is estimated at the decoder for the DIMD method, no intra prediction information needs to be coded into bit-stream. Therefore, when the DIMD mode is enabled, the number of directional intra prediction modes can be increased with no signaling cost. Thus, in order to more accurately capture the edge directions in natural videos, in one embodiment of the disclosure, when the DIMD mode is enabled, the granularity of angular intra prediction modes is increased (but without increased signaling cost).

In HEVC, bilinear interpolation is applied to obtain intra predicted samples when the target samples are predicted from one reference sample at fractional position. Specifically, each predicted sample P(x,y) at location (x,y) is obtained by projecting its location onto a reference row of pixels based on the selected prediction direction and interpolating a value for the sample at $\frac{1}{32}$ sample accuracy, where bilinear interpolation is performed linearly utilizing two closest reference samples at integer position.

$$p(x, y) = ((32 - w_y) \cdot R_i + w_y \cdot R_{i+1} + 16) \gg 5 \qquad (7)$$

where $w_y$ is the weighting parameter between two integer reference samples $R_i$ and $R_{i+1}$ which specifies the segment covering the projected fractional location and $\gg$ denotes a right bit-shift operation. The reference sample index i and $w_y$ are calculated based on the projection displacement d corresponding to the selected intra prediction mode (which describes the tangent of the intra prediction direction in the precision of $\frac{1}{32}$ sample) as $$c_y = (y \cdot d) \gg 5 \qquad (8)$$

$$w_y = (y \cdot d) \& 31$$

$$i = x + c_y$$

where & denotes bitwise AND operation. Table 3 specifies the values of the projection displacement d for different intra prediction directions.

TABLE 3

Mapping between intra prediction direction preModeIntra and projection displacement d for the 33 angular intra prediction directions in HEVC

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| d | — | 32 | 26 | 21 | 17 | 13 | 9 | 5 | 2 | 0 | −2 | −5 | −9 | −13 | −17 | −21 | −26 |

| predModeIntra | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| d | −32 | −26 | −21 | −17 | −13 | −9 | −5 | −2 | 0 | 2 | 5 | 9 | 13 | 17 | 21 | 26 | 32 |

15

As discussed above, when the DIMD mode is selected, the number of supported angular intra prediction directions may be increased. Correspondingly, the existing $\frac{1}{32}$ sample accuracy may be insufficient to represent all possible directional intra prediction in the finer granularity. Therefore, in one embodiment of the disclosure, the accuracy of the intra interpolation filtering is increased when the DIMD mode is enabled for the current video block. Assuming bilinear interpolation is applied, let us denote $2^B$ as the number of defined fractional samples for the finer granularity intra prediction, the filtering process (as defined in (7)) and the reference sample index derivation (as defined in (8)) for the intra prediction of the DIMD mode are defined as $$p(x, y) = \left(\left(2^B - w_y\right) \cdot R_i + w_y \cdot R_{i+1} + 2^{B-1}\right) \gg B \quad (9)$$

$$c_y = (y \cdot d) \gg B \quad (10)$$

$$w_y = (y \cdot d) \,\&\, 2^B$$

$$i = x + c_y$$

Additionally, the dynamic range of the projection displacement d may also be enlarged in order to represent the

16

$-(L/2-1), \ldots, 0, 1, \ldots L/2$, where L is the interpolation filter length, the value of the predicted sample P(x, y) at location (x, y) is calculated as $$p(x, y) = \left( \sum_{k=-(L/2-1)}^{L/2} f_{w_y}(k) R_{i+k} + 2^{H-1} \right) \gg H \quad (11)$$

$$c_y = (y \cdot d) \gg B$$

$$w_y = (y \cdot d) \,\&\, 2^B$$

$$i = x + c_y$$

where H is the number of bits for representing filter coefficients. As shown in (11), the filter coefficients $f_{w_y}(k)$ is dependent on the corresponding phase (i.e., $w_y$, $w_y=0, 1, \ldots, 2^B-1$) of the interpolated fractional sample in-between the corresponding integer samples.

TABLE 4

Mapping between intra prediction direction preModeIntra and projection displacement d for 129 angular intra prediction directions

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| d | — | 64 | 61 | 58 | 55 | 52 | 49 | 46 | 44 | 42 | 40 | 38 | 36 | 34 | 32 | 30 | 28 |
| predModeIntra | 18 | 19 | 20 | 21 | 22 | 23 | 24 | 25 | 26 | 27 | 28 | 29 | 30 | 31 | 32 | 33 | 34 |
| d | 26 | 24 | 22 | 20 | 18 | 16 | 14 | 12 | 10 | 8 | 6 | 5 | 4 | 3 | 2 | 1 | 0 |
| predModeIntra | 35 | 36 | 37 | 38 | 39 | 40 | 41 | 42 | 43 | 44 | 45 | 46 | 47 | 48 | 49 | 50 | 51 |
| d | −1 | −2 | −3 | −4 | −5 | −6 | −8 | −10 | −12 | −14 | −16 | −18 | −20 | −22 | −24 | −26 | −28 |
| predModeIntra | 52 | 53 | 54 | 55 | 56 | 57 | 58 | 59 | 60 | 61 | 62 | 63 | 64 | 65 | 66 | 67 | 68 |
| d | −30 | −32 | −34 | −36 | −38 | −40 | −42 | −44 | −46 | −49 | −52 | −55 | −58 | −61 | −64 | −61 | −58 |
| predModeIntra | 69 | 70 | 71 | 72 | 73 | 74 | 75 | 76 | 77 | 78 | 79 | 80 | 81 | 82 | 83 | 84 | 85 |
| d | −55 | −52 | −49 | −46 | −44 | −42 | −40 | −38 | −36 | −34 | −32 | −30 | −28 | −26 | −24 | −22 | −20 |
| predModeIntra | 86 | 87 | 88 | 89 | 90 | 91 | 92 | 93 | 94 | 95 | 96 | 97 | 98 | 99 | 100 | 101 | 102 |
| d | −18 | −16 | −14 | −12 | −10 | −8 | −6 | −5 | −4 | −3 | −2 | −1 | 0 | 1 | 2 | 3 | 4 |
| predModeIntra | 103 | 104 | 105 | 106 | 107 | 108 | 109 | 110 | 111 | 112 | 113 | 114 | 115 | 116 | 117 | 118 | 119 |
| d | 5 | 6 | 8 | 10 | 12 | 14 | 16 | 18 | 20 | 22 | 24 | 26 | 28 | 30 | 32 | 34 | 36 |

| predModeIntra | 120 | 121 | 122 | 123 | 124 | 125 | 126 | 127 | 128 | 129 | 130 |
|---|---|---|---|---|---|---|---|---|---|---|---|
| d | 38 | 40 | 42 | 44 | 46 | 49 | 52 | 55 | 58 | 61 | 64 | tangent values of the increased intra prediction granularity. In a case where the number of intra prediction directions is 131 (including planar, DC and 129 angular intra directions) and the accuracy of intra interpolation is $\frac{1}{64}$ sample, Table 4 shows the projection displacement values d associated with the 129 angular intra prediction directions.

In another embodiment, a DIMD method with increased angular direction granularity may be used in combination with other interpolation methods. Denoting $f_{w_y}(k)$ as the coefficients of the applied interpolation filter, k=

When an intra block is coded in DIMD mode, the derived intra prediction mode may be used as one of the MPM candidates to predict the intra prediction modes of neighboring intra blocks. Correspondingly, the high-accuracy intra prediction directions of the DIMD-coded blocks may be rounded to the intra prediction accuracy of normal intra mode in order to ensure the intra prediction mode of the neighboring intra blocks to be predicted and the MPM candidate from the DIMD mode have the same precision. Therefore, in one embodiment of the disclosure, when finer granularity intra prediction is enabled (e.g., 129 angular directions) for DIMD-coded blocks, the high-accuracy intra prediction mode of the current DIMD block may be rounded to the nearest intra prediction mode in the coarse granularity (e.g., 65 angular directions) before it is stored and used as MPM candidate for predicting the intra prediction mode of its neighboring intra blocks. In the case when two neighboring coarse-accuracy intra directions have equal distance to the high-accuracy intra direction, one fixed rule (e.g., always rounding to the coarse-accuracy intra direction with smaller intra direction index, or always rounding to the coarse-accuracy intra direction which is closer to 45 degrees) may be applied.

Granularity of Deriving Intra Prediction Mode for DIMD.

In embodiments described above, the DIMD mode is enabled/disabled (as indicated by the flag derive_intra_prediction_mode_flag) at the CU level. However, the adaptation of the derived intra prediction mode can be conducted at various coding levels, such as CU level, PU level and TU level. Each adaptation level provides different trade-offs between coding efficiency and encoding/decoding complexity. For example, if the derived intra prediction mode is adapted at the TU level, the encoder/decoder derives an intra prediction mode for each individual TU. If the derived intra prediction mode is adapted at the PU level, the encoder/decoder derives one intra prediction mode for each individual PU and all the TUs inside that PU will use the same derived intra mode for their own intra prediction. If the derived intra prediction mode is adapted at the CU level, encoder/decoder only derives one intra prediction mode for the whole CU, and all the TUs inside that CU will use the same derived intra mode for their intra prediction. The flag derive_intra_prediction_mode_flag may be only signaled when the CU only has one PU (e.g. 2N×2N).

On the other hand, the level to enable/disable the DIMD mode does not have to be the same as the adaptation level of deriving the intra prediction mode. For example, the DIMD mode may be enabled at the CU level while the corresponding intra prediction mode derivation may be done at either CU level, PU level or TU level. In one embodiment of the disclosure, the level to enable/disable the DIMD mode is kept to be the same as that of intra prediction mode derivation. In another embodiment of the disclosure, the level to enable/disable the DIMD mode is different from the level of intra prediction mode derivation, and the level of intra prediction mode derivation can be lower than the level of DIMD mode signaling. For example, even if the DIMD flag is signaled at the CU level, each PU or TU in that CU can still apply the DIMD method to derive their own intra prediction mode separately. When the CU level flag, derive_intra_prediction_mode_flag, is turned on, that is, DIMD is enabled for the current CU, an additional flag may be signaled to indicate the level (e.g., PU level or TU level) at which DIMD is performed in the current CU. Whether a PU is further split into more than one TU using the Recursive Quad Tree (RQT) is determined by the RQT depth. When the RQT depth is equal to 0, the PU is not further split, and there is only one TU in the PU with the same size. In this first case, the additional flag is not signaled, and DIMD is performed at PU level (which is the same as TU level). When the RQT depth is larger than 0, the PU may be further split into more than one TU. In this second case, the additional flag is signaled (after RQT depth is signaled), and its value may be used to determine the level at which DIMD is performed (TU or PU level) in the current CU.

Intra Prediction Mode Search Algorithm.

In contrast to the conventional intra prediction mode which estimates the optimal intra prediction mode and transmits it to the decoder, the intra prediction modes of DIMD-coded blocks are estimated at the decoder side. Thus, the searching method used to find the intra prediction mode that yields the best template distortion has a significant impact on the complexity and overall performance of the DIMD method, as the same searching process is performed at both the encoder and the decoder in order to ensure that the reconstructed video at the decoder matches that at the encoder. Below, different searching methods are disclosed which can result in various trade-offs between coding performance and encoding/decoding complexity.

Full search for DIMD. One method of searching for the optimal intra prediction mode for DIMD is full search, where the template cost measurement (as discussed above) is calculated for all available intra prediction modes and the one having the minimal template cost will be selected as the intra prediction mode of the target block. Although the full search method can estimate the intra prediction mode in the most accurate way, it introduces a high amount of complexity increase (especially at the decoder) and therefore may not be preferable for practical codec design.

Multi-stage search for DIMD. As discussed above, when the DIMD mode is selected, the number of supported directional intra prediction modes is sufficient to cover the edge directions in natural video, especially when the high-accuracy intra prediction (e.g. fine granularity intra prediction) is enabled for DIMD. Therefore, the template costs of those neighboring intra prediction modes may not deviate substantially. Therefore, in order to reduce the searching complexity, in one embodiment a multi-stage search method is used to identify the optimal intra prediction mode. Such multi-stage searching process may compare at each stage the template cost measurement for a subset of intra prediction mode candidates within an initial searching interval and maintain the intra prediction mode that minimizes the cost; the selected intra prediction mode from the last stage will be used as the searching center for the current stage with a reduced searching interval (e.g., the search interval may be reduced by half). Specifically, the above searching method can be summarized by the following procedures:

Step 1: Initializing the center intra prediction mode $Pred_1=(Num\_Pred\_Mode-1)/2$ and searching interval $Dist=(Num\_Pred\_Mode-1)/2$, where Num_Pred_Mode is the number of valid intra prediction modes. Set k=0 and kmax=log 2(Num_Pred_Mode);

Step 2: Given the center intra prediction mode $Pred_1$, calculate the other two searching intra prediction modes $Pred_0=Pred_1-Dist$, $Pred_2=Pred_1+Dist$.

Step 3: For i from 0 to 2, calculate the corresponding template cost measurement $Cost_i$ of using intra prediction mode $Pred_i$ and select the optimal intra prediction mode Pred* as the one that minimizes the template cost.

Step 4: Set $Pred_1=Pred*$, Dist=Dist/2 and k=k+1; If k<kmax, go to step 2; otherwise, terminate.

Figure 11A:
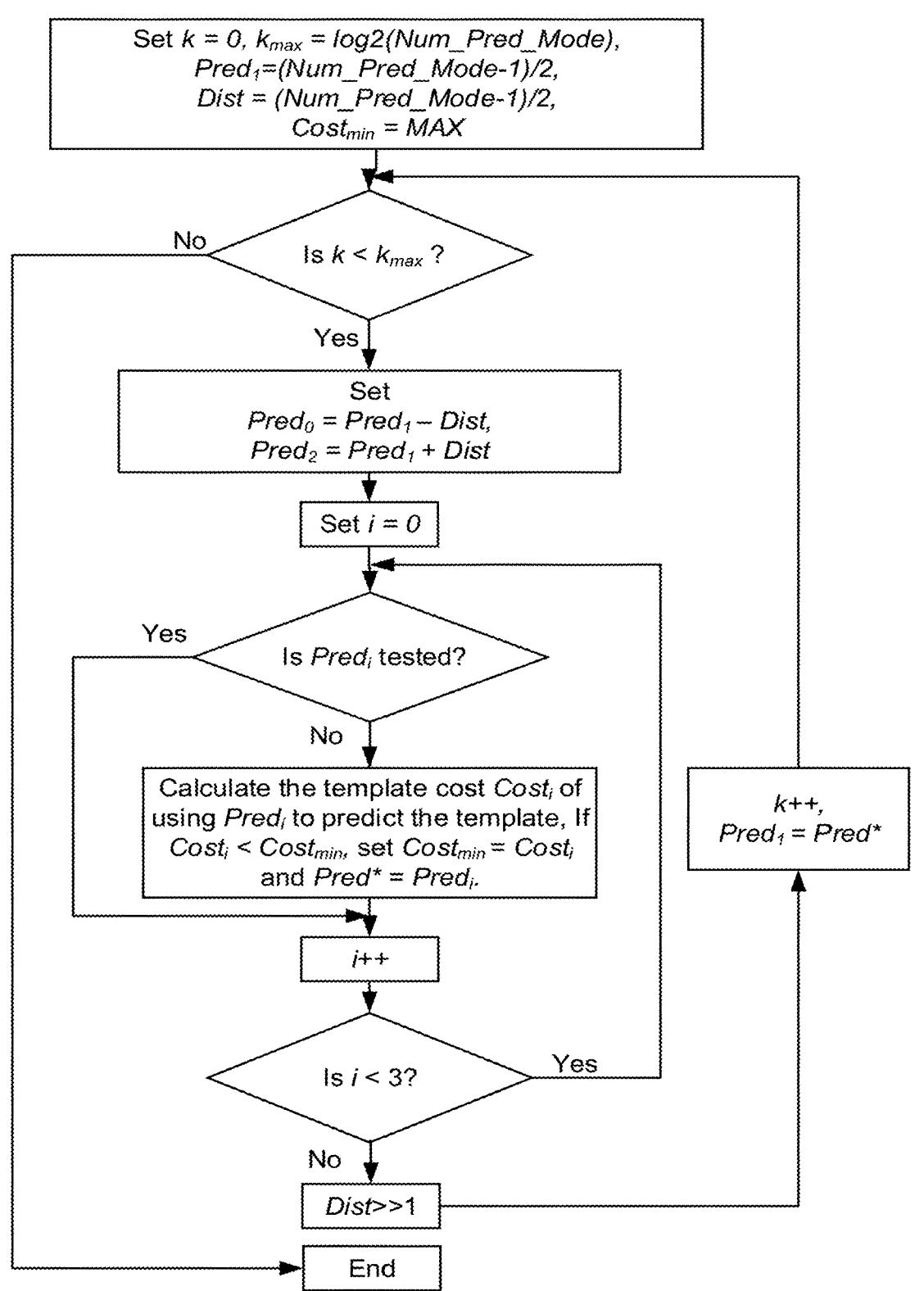
FIG. 11A depicts an exemplary flowchart for one embodiment of a multi-stage DIMD searching algorithm.

FIG. 11A is a flow chart of an exemplary DIMD multi-stage searching method as set forth above. In the exemplary steps above and in FIG. 11A, three candidates (that is, $Pred_i$ for i=0, 1, 2) are tested at each stage and the optimal mode is selected out of these three candidates. In another embodiment, a different number of candidates (e.g., more than three candidates) may be tested at each stage to select the optimal mode at that stage.

In multi-stage DIMD searching methods, the search starting point has an effect on the overall DIMD performance, which determines whether the whole searching process could converge to the actual intra direction of the local area.

In FIG. 11A, only three intra modes (e.g., one center intra mode and two boundary intra modes) are served as the candidates to determine the starting search point at the initial stage, which may not be good enough to estimate the local intra prediction direction. Therefore, to further improve the DIMD performance while maintaining an acceptable encoding/decoding complexity, an initial estimation process is used in some embodiments of the disclosed multi-stage DIMD searching method to provide a better initial search point. Specifically, a candidate list $S_{init}$ is firstly created by selecting N fixed modes from the allowed intra modes and then the template costs are measured for the candidate intra modes in $S_{init}$ and the one that minimizes the cost is selected as the starting search direction. Based on the starting direction determined by the above estimate process, the multi-stage searching process is then applied to find the best estimate of local intra direction through iteratively updating the searching center and the search interval in the same way as shown in FIG. 11A. In summary, this searching process can be described by the following procedures:

Step 1: Given the initial intra mode candidate list, calculate the corresponding template cost measurement for each candidate intra mode and select the intra prediction mode as the initial search direction $Pred_{init}$. Calculate initial search interval $Dist_{init}$. Set the search center $Pred_1$ equal to $Pred_{init}$, the initial search interval Dist equal to $Dist_{init}$ and k=0.

Step 2: Calculate the other searching intra modes $Pred_0=Pred_1-Dist$, $Pred_2=Pred_1+Dist$.

Step 3: For i from 0 to 2, calculate the corresponding template cost measurement $Cost_i$ of using intra prediction mode $Pred_i$ and select the optimal intra prediction mode Pred* as the one that minimize the template cost.

Step 4: Set $Pred_1=Pred*$, Dist=Dist/2 and k=k+1; If k<kmax, go to step 2; otherwise, terminate.

Figure 11B:
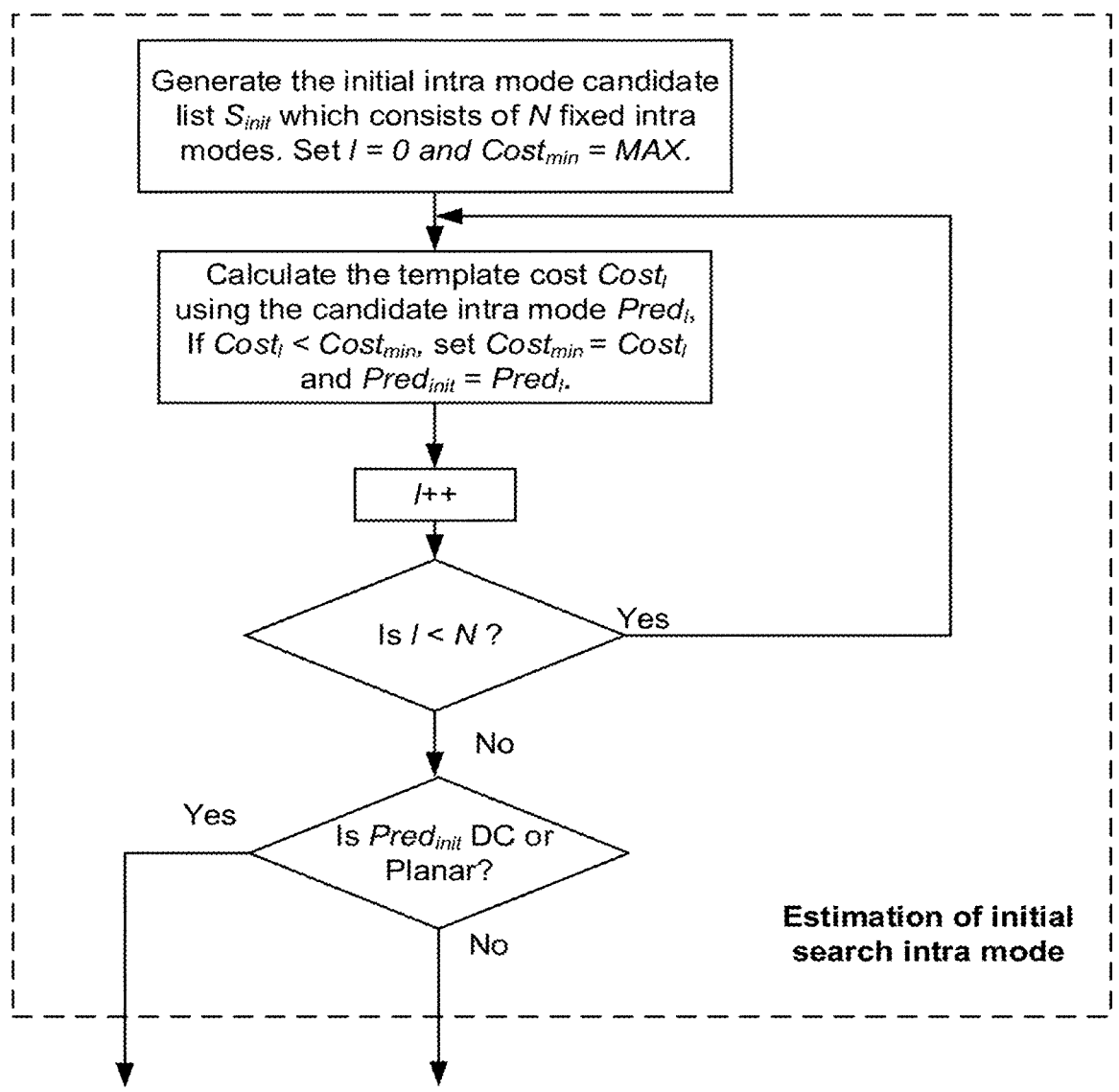
FIGS. 11B-11C depict an exemplary flowchart for one embodiment of a multi-stage DIMD searching algorithm with improved estimation of initial search intra mode.
Figure 11C:
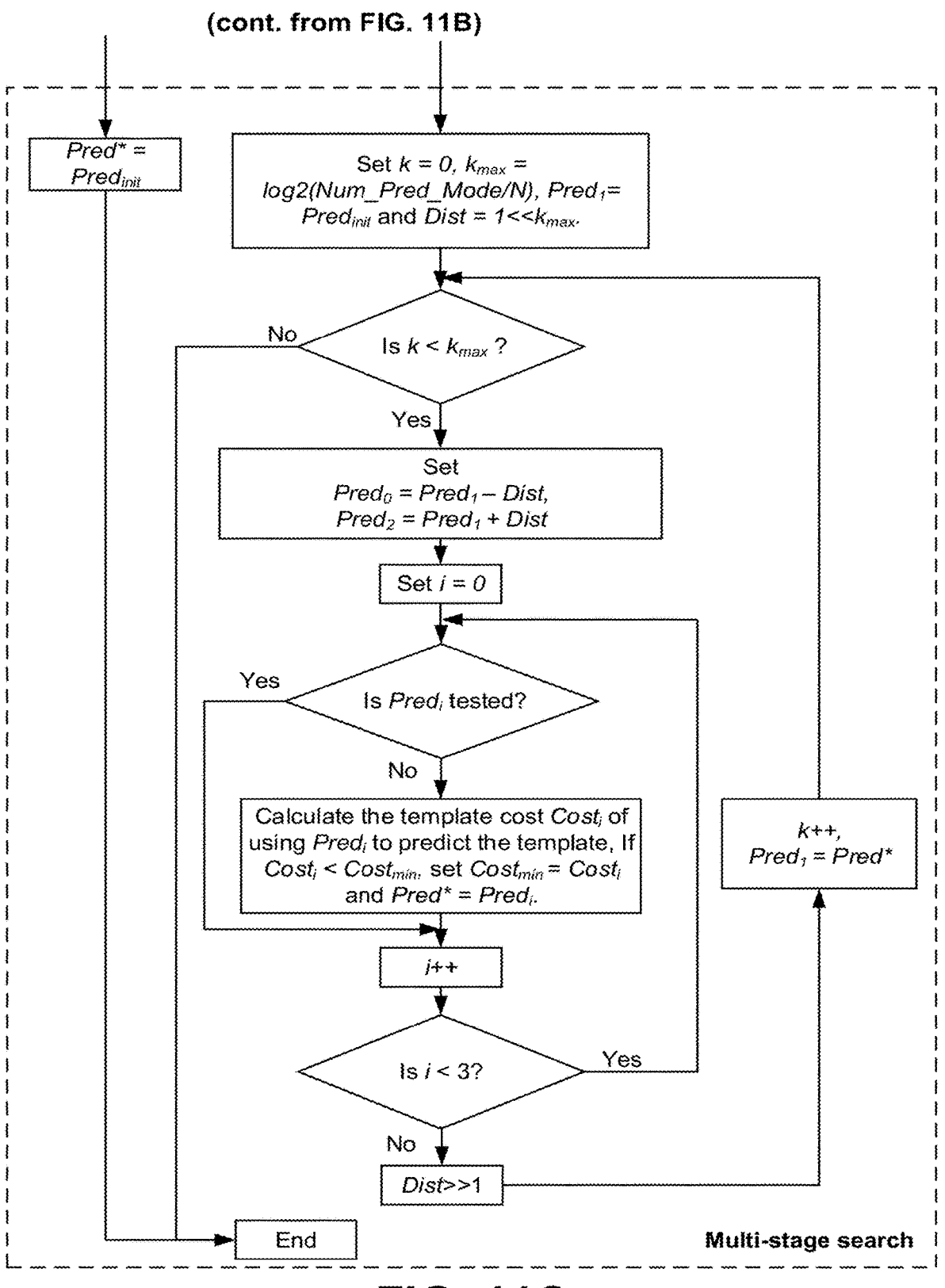

FIG. 11B-11C is a flowchart of an exemplary embodiment of the DIMD multi-stage searching method using the disclosed improved estimation of the initial search direction. As shown in FIG. 11B-11C, DC and Planar modes may, in some embodiments, always be included in the initial candidate list $S_{init}$ to determine the starting search mode. To reduce the searching complexity, the multi-stage search process may be directly skipped in case the starting search mode is either DC or Planar. In another embodiment of the disclosure, DC and Planar modes may be adaptively added into the initial candidate list based on the local characteristic of the current coding block (e.g., referring to the intra modes of neighboring blocks). Specifically, if one or more neighbors of the current coding blocks are coded by DC or Planar, then DC and Planar modes may be considered as the candidates to find the optimal starting search mode (e.g., being included in the initial candidate list); otherwise, DC and Planar may not be considered (e.g., being excluded from the initial candidate list). As shown in FIG. 11B-11C, in some embodiments, different intra modes may be used to generate the initial candidate list for determining the optimal starting search intra mode. In one embodiment of the disclosure, the default 35 intra modes as defined by HEVC, e.g., 33 angular directions plus DC and Planar modes, may be used to form the initial candidate list for determining the initial search. In another embodiment, other selection method of initial candidate intra modes may also be applied at the initial stage of the disclosed fast searching method.

In the above fast search method, a number of angular intra modes are always included in the initial search candidate list $S_{init}$. This may increase the complexity of the initial search process. To further reduce the search complexity, in one embodiment of the disclosure, it is proposed to adaptively include/exclude angular intra modes into the initial candidate list based on the intra modes of the spatial neighbors of the current block. Specifically, if one or more spatial candidates are coded by DC or Planar, then only DC and Planar will be considered as the search candidates to find the optimal best intra mode and the multi-stage search process is directly skipped; otherwise, a number of angular intra modes (e.g., 33 angular HEVC directions) along with DC and Planar will be included in the initial search candidate list.

In one embodiment of a multi-stage fast searching algorithm, the template costs of up to three candidate intra modes are calculated at each stage. However, compared to HEVC and JEM, the increased granularity of intra modes for the DIMD mode provides a more accurate description of the fine edges in natural video. Correspondingly, the template cost of close neighboring intra modes may not deviate a lot, and therefore may not have a significant coding performance difference when they are used as the intra mode of DIMD block. Based on this observation, an early termination method is proposed to simplify the complexity of the multi-stage search process. Specifically, at one given stage, the template costs of the N candidate intra modes, i.e., $TC_0$, $TC_1$, . . . , $TC_{N-1}$, are calculated at the current stage. After that, the variation of the template costs are evaluated as follows:

$$\text{var} = \frac{TC_{max} - TC_{min}}{TC_{min}} \qquad (12)$$

where $TC_{max}$ and $TC_{min}$ are the maximum and minimum of the N template costs $TC_0$, $TC_1$, . . . , $TC_{N-1}$, respectively. If the variation value is no larger than a given threshold, the multi-stage searching process is terminated; otherwise, it proceeds to the next searching stage. In another embodiment, other variation evaluation methods may also be used in the early-termination algorithm.

Figure 19B:
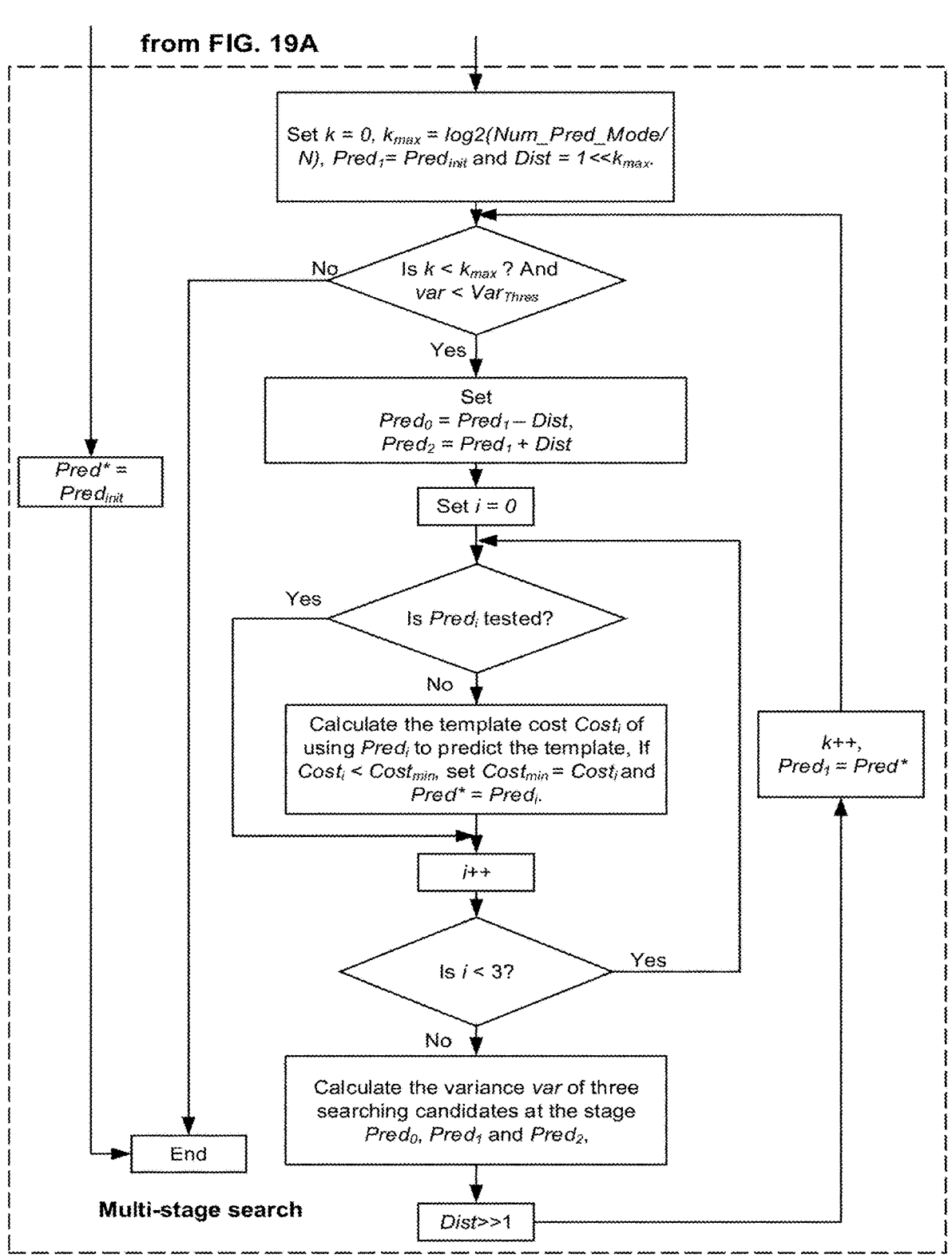

FIGS. 19A and 19B are a flowchart of one embodiment of the proposed multi-stage DIMD searching method with the early termination conditions on the intra modes of spatial neighbors and the variation of the template costs of the searching candidates at each stage.

Candidate-based DIMD search. To speed-up the DIMD searching process, in one embodiment, a candidate-based searching algorithm may be used. The principle of the candidate-based searching method is to select a set of unique intra prediction modes for which the template cost measurement needs to be calculated. The number of the intra prediction mode candidates in the set should be relatively small in order to significantly reduce the searching complexity of DIMD. In particular, several intra prediction mode candidates as discussed below may be evaluated due to their suitability.

Modes of the spatial neighbors: under the assumption that there is a high spatial correlation in typical video content, the intra prediction mode of video blocks neighboring to the target block may be used as the candidate(s) for the DIMD search. Specifically, one embodiment of the method may select the N (e.g., N=2) most frequently used intra prediction modes along the top neighboring row and along the left neighboring column of the target block. These neighboring modes may be fetched at the basic coding unit level (i.e., 4×4 block in HEVC and JEM) of these neighbors and used as the candidate(s) for DIMD search.

DC mode: DC prediction uses an average value of reference samples to predict the sample value of the target block. If the target block is located in a flat region without rich textures, DC mode may provide a good approximation of the predicted area. Therefore, in one embodiment of the searching method, DC mode is added into the candidate set if none of the spatial neighbors of the target blocks uses DC mode.

Planar mode: While angular intra mode provides good prediction in the presence of edges, not all image areas fits the edge mode. Alternatively, planar mode, which uses bilinear mode to predict the target block, can provide a good estimation of the target block when the angular mode does not work. Therefore, in one embodiment of the method, planar mode is also added into the candidate set if none of the spatial neighbors of the target blocks uses planar mode.

In an embodiment, for the candidate-based searching method discussed above, only prediction modes of the spatial neighbors, DC and planar modes are tested as candidate modes for the target block. To further improve the accuracy of the estimated intra prediction mode, one refinement process may be further applied by using the best intra mode from the searching candidate set as the center point and search those other neighboring intra prediction directions within a relatively small range (e.g., ±2) of that best intra mode which have not already been included in the previous candidate set. The refinement process may further improve the accuracy of the estimated intra mode by finding better fit for the local edge direction; this also keeps the searching complexity at an acceptable level.

In addition to spatial neighbors, the modes of the temporal neighbors may also be used. For example, if the collocated blocks in a neighboring picture are coded using intra prediction, then the prediction modes of those temporal neighboring blocks may be included in the candidate list as well. DIMD for Chroma.

Since the human vision system is much more sensitive to variations in brightness than color, a video coding system usually devotes more bits to the luma component than chroma components, e.g., by adjusting the QP delta value between luma component and chroma components. Therefore, the chroma components contain much less detail information (e.g., edges and textures) than the luma component. Based on this observation, there is no need to check as many intra prediction modes for chroma DIMD as for luma DIMD. On the other hand, given the strong correlation between luma plane and chroma planes, it is highly possible that chroma prediction uses the same intra prediction mode as the luma prediction. Therefore, in one embodiment of the disclosure, when the DIMD mode is enabled for one video block, the chroma component will reuse the same intra prediction mode as that derived for the luma component.

Additionally, given the fact that the chroma coding performance can be significantly improved by utilizing the cross component correlation, the linear model (LM) mode as specified in current JEM may also be considered when DIMD mode is enabled for the current block in order to improve the chroma coding efficiency and thus the overall R-D performance of the DIMD mode. Therefore, in one embodiment of the disclosure, when DIMD mode is enabled for one video block, both the derived intra prediction mode of luma component and the LM mode will be tested for the template samples; then, the one with smaller template cost will be selected as the intra prediction mode of the chroma components.

Using Intra Prediction Mode from DIMD for MPM.

If there is strong correlation between the target block and its template, the DIMD method can provide a good estimate of the optimal intra prediction mode for the target block. This estimated intra prediction mode can be used not only to avoid the signaling of intra prediction parameters (e.g., intra prediction modes) of the DIMD-coded blocks, but also to predict the intra prediction modes of non-DIMD-coded neighboring blocks due to the strong spatial correlation of natural video content.

In one embodiment of the disclosure, the derived intra prediction direction from DIMD may be added as one candidate into the MPM list for intra mode prediction of the current block which is coded by normal intra mode (that is, its intra prediction mode is explicitly signaled). In one embodiment, the intra mode derived by DIMD may be added as one additional candidate of the MPM list and increase the size of the MPM list by 1. To not increase the overhead of MPM index signaling, one embodiment of the method may replace one existing MPM candidate (e.g., the last MPM candidate) by the DIMD derived prediction mode and the size of the MPM list may be kept unchanged. Additionally, given the strong correlation between DIMD derived intra prediction mode and the actual optimal intra prediction mode of the current block, one embodiment of the method may always place the DIMD derived prediction mode at the first place in the MPM list. Also, one embodiment may include a pruning operation such that the DIMD derived mode will not be added into the MPM list if it is redundant (i.e., if the DIMD derived mode is exactly the same as one existing MPM candidate in the list).

Interaction of DIMD with the Existing Intra Coding Tools in JEM.

Some embodiments combine the DIMD method with the existing intra coding tools of JEM. In this section, several embodiments involving interactions of DIMD with non-separable secondary transform (NSST), position dependent intra prediction combination (PDPC) and reference sample adaptive filtering (RSAF) are disclosed.

Interaction of DIMD with NSST. As discussed previously, the CU-level NSST flag is signaled only when there is at least one non-zero transform coefficient in the current CU, e.g., rqt_root_cbf is equal to 1. On the other hand, when the DIMD mode is applied below CU level, that is, at TU-level or PU-level, the corresponding parsing and decoding processes are carried over at the TU-level or PU-level, given the reconstructed samples of the current TU or PU may be used as the template for the samples of its neighboring TU or PU. In other words, when DIMD is enabled at TU or PU-level, the parsing and decoding of the current TU or PU are not started until the preceding TU or PU (according to encoding/decoding order) is completely reconstructed. Given that the NSST flag needs to be known for the decoding process of one TU or PU, it is not feasible to enable the DIMD mode at TU or PU-level based on the current NSST signaling design.

In order to solve the abovementioned problem, one embodiment of the disclosure may postpone the signaling of NSST flag until the transform coefficients of the first non-all-zero TU in CU are signaled. Specifically, during the decoding process of one DIMD-coded CU, the decoder always starts with setting the NSST flag as 0, and parse and decode the TUs in the CU according to the decoding order; after the decoder parses the transform coefficients of the first TU in the CU that has at least one non-zero coefficient, the decoder will continue to parse the NSST flag value from the bit-stream and use it for the decoding process of the current and the following TUs. In case that the transform coefficients of all the TUs in CU are zero, the NSST flag of the CU will not be parsed; instead the flag is always inferred as 0 for decoding the TUs in that CU. Using the current HEVC draft as basis, Table 5 illustrates an embodiment of the NSST flag signaling when DIMD and NSST are jointly enabled. The location of the NSST flag is marked by *.

24 intra prediction mode of the target block by predicting template samples based on PDPC intra prediction when PDPC mode is enabled for the target block.

Specifically, the PDPC intra prediction (as specified in Equations (1) and (2)) is firstly applied to the reference samples of the template to generate the corresponding intra prediction signal of the template for each intra prediction mode (as shown FIG. 6). Then, the encoder/decoder will calculate the template cost measurements between the reconstructed template signal and each prediction signal of

TABLE 5

| An NSST flag signaling when DIMD and NSST are jointly applied | Descriptor |
|---|---|
| transform_tree( x0, y0, xBase, yBase, log2TrafoSize, trafoDepth, blkIdx ) { | |
|   if( log2TrafoSize <= MaxTbLog2SizeY && | |
|     log2TrafoSize > MinTbLog2SizeY && | |
|     trafoDepth < MaxTrafoDepth && !( IntraSplitFlag && ( trafoDepth = = 0 ) ) ) | |
|     split_transform_flag[ x0 ][ y0 ][ trafoDepth ] | ae(v) |
|   if( ( log2TrafoSize > 2 && ChromaArrayType != 0 ) \| \| ChromaArrayType = = 3 ) { | |
|     if( trafoDepth = = 0 \| \| cbf_cb[ xBase ][ yBase ][ trafoDepth − 1 ] ) { | |
|       cbf_cb[ x0 ][ y0 ][ trafoDepth ] | ae(v) |
|       if( ChromaArrayType = = 2 && | |
|         ( !split_transform_flag[ x0 ][ y0 ][ trafoDepth ] \| \| log2TrafoSize = = 3 ) ) | |
|         cbf_cb[ x0 ][ y0 + ( 1 << ( log2TrafoSize − 1 ) ) ][ trafoDepth ] | ae(v) |
|     } | |
|     if( trafoDepth = = 0 \| \| cbf_cr[ xBase ][ yBase ][ trafoDepth − 1 ] ) { | |
|       cbf_cr[ x0 ][ y0 ][ trafoDepth ] | ae(v) |
|       if( ChromaArrayType = = 2 && | |
|         ( !split_transform_flag[ x0 ][ y0 ][ trafoDepth ] \| \| log2TrafoSize = = 3 ) ) | |
|         cbf_cr[ x0 ][ y0 + ( 1 << ( log2TrafoSize − 1 ) ) ][ trafoDepth ] | ae(v) |
|     } | |
|   } | |
|   if( split_transform_flag[ x0 ][ y0 ][ trafoDepth ] ) { | |
|     x1 = x0 + ( 1 << (log2TrafoSize − 1 ) ) | |
|     y1 = y0 + ( 1 << (log2TrafoSize − 1 ) ) | |
|     transform_tree( x0, y0, x0, y0, log2TrafoSize − 1, trafoDepth + 1, 0 ) | |
|     transform_tree( x1, y0, x0, y0, log2TrafoSize − 1, trafoDepth + 1, 1 ) | |
|     transform_tree( x0, y1, x0, y0, log2TrafoSize − 1, trafoDepth + 1, 2 ) | |
|     transform_tree( x1, y1, x0, y0, log2TrafoSize − 1, trafoDepth + 1, 3 ) | |
|   } else { | |
|     if( CuPredMode[ x0 ][ y0 ] = = MODE_INTRA \| \| trafoDepth != 0 \| \| | |
|       cbf_cb[ x0 ][ y0 ][ trafoDepth ] \| \| cbf_cr[ x0 ][ y0 ][ trafoDepth ] \| \| | |
|       ( ChromaArrayType = = 2 && | |
|         ( cbf_cb[ x0 ][ y0 + ( 1 << ( log2TrafoSize − 1 ) ) ][ trafoDepth ] \| \| | |
|           cbf_cr[ x0 ][ y0 + ( 1 << ( log2TrafoSize − 1 ) ) ][ trafoDepth ] ) ) ) | |
|       cbf_luma[ x0 ][ y0 ][ trafoDepth ] | ae(v) |
|     transform_unit( x0, y0, xBase, yBase, log2TrafoSize, trafoDepth, blkIdx ) | |
|     if( cbf_luma[ x0 ][ y0 ][ trafoDepth ] \|\| cbf_cb[ x0 ][ y0 ][ trafoDepth ] \| \| | |
|       cbf_cr[ x0 ][ y0 ][ trafoDepth ] \|\| ( ChromaArrayType = = 2 && | |
|       ( cbf_cb[ x0 ][ y0 + ( 1 << ( log2TrafoSize − 1 ) ) ][ trafoDepth ] \| \| | |
|         cbf_cr[ x0 ][ y0 + ( 1 << ( log2TrafoSize − 1 ) ) ][ trafoDepth ] ) ) ) | |
| *     cu_nsst_flag | ae(v) |
|   } | |
| } | |

Interaction of DIMD with PDPC. For all the above discussion, the DIMD mode is enabled by deriving the intra prediction mode using template samples in the manner of HEVC intra prediction, where an intra prediction signal is computed from either a nonfiltered or a filtered set of reference border pixels, depending on the predictor mode and block size. However, as previously discussed, when PDPC is enabled, it generates the intra prediction signal by employing weighted combinations of filtered references and predictions from unfiltered references. Correspondingly, the intra prediction mode derived in the HEVC intra prediction manner cannot provide a good estimate of the optimal intra prediction mode of one PDPC-coded block because PDPC is not considered in the intra prediction mode derivation process. Therefore, in order to improve the coding efficiency of DIMD, one embodiment of the disclosure may estimate the the template. The intra prediction mode that has the smallest cost will be considered as the intra prediction mode of the target block.

Interaction of DIMD with RASF. As discussed above, when RSAF is used for the current block, two different sets of low-pass filters may be applied to smooth reference samples for the intra prediction of the current block. Correspondingly, the same reference smoothing filter should be also applied to the reference samples of the template in order to estimate the intra prediction mode more accurately. On the other hand, since data hiding is used to hide the RSAF flag into the transform coefficients of each TU, it is impossible to know the RSAF flag value before the transform coefficients of the TU are completely parsed. Additionally, since the transform coefficient parsing process is dependent on the intra prediction mode of the TU (because the intra prediction mode is used to infer the scanning order of the transform coefficients), it is impossible to know which low-pass filter is selected (the RSAF flag) when deriving the intra prediction mode of the DIMD-coded TUs.

In order to resolve the above problem, one embodiment of the present disclosure may remove the parsing dependency of coefficient scanning order on intra prediction direction for DIMD-coded TUs. Specifically, when DIMD is used to code one TU, one fixed scanning order (e.g., diagonal scan order) is always assumed to be used for scanning the transform coefficients of that TU. In this way, the decoder is able to parse the transform coefficients of one DIMD-coded TU without knowing the specific intra prediction mode of the TU and therefore identify the value of the RSAF flag of the TU. In this way, the low-pass filter indication is inferred after all transform coefficients within TU are parsed. Then, the corresponding low-pass filter (as indicated by the RSAF flag) will be used to derive the intra prediction mode based on the template which is then used to do the intra prediction of the current block. In another embodiment, instead of adaptively choosing one of the two low-pass filters as in RSAF, one fixed reference sample low-pass filter may be used for DIMD; this low-pass filter may be different from the low-pass filter indicated by the RSAF flag which is used for target block coding.

Parsing Dependency in the Derivation of Transform Coefficient Scanning Order.

Given that the intra mode of one DIMD coded block does not need to be transmitted, there could be a large percentage of blocks in one picture that select DIMD mode. Therefore, it is preferable to avoid introducing any parsing dependencies for the DIMD design in order to maintain a high-throughput implementation. In general, there are two kinds of potential parsing dependencies that may be introduced due to the interaction of DIMD with the existing tools in JEM: (i) parsing dependency in the derivation of transform coefficient scanning order and (ii) parsing dependency in syntax signaling. The former refers to the parsing dependency in the determination of transform coefficient scanning order on decoded intra prediction mode, while the latter refers to the parsing dependency that the signaling of a given syntax element depends on decoded intra prediction mode.

In HEVC and JEM, mode dependent coefficient scanning (MDCS) is used to improve the efficiency of transform coefficient coding. Specifically, for intra coded blocks, the scanning order of certain block sizes (4×4 and 8×8 TUs in HEVC, and BTs which have either width or height smaller or equal to 8) is determined by the intra prediction mode. Each intra prediction mode can use one of three possible scanning orders: diagonal, horizontal and vertical. A look-up table is used to map each intra prediction mode into a corresponding scanning order. Based on this design, there are three issues that make the transform coefficient scanning order not be able to be directly derived during the parsing stage after the DIMD is introduced.

Firstly, unlike conventional intra coded blocks whose intra prediction modes are explicitly signaled and are reconstructed during the parsing process, the intra modes of DIMD coded blocks are derived from the reconstructed neighboring samples. Therefore, the scanning order of DIMD coded blocks can only be known after all the corresponding neighboring samples are fully reconstructed, e.g., at the decoding/reconstruction stage. This means that the transform coefficients of DIMD coded blocks cannot be parsed until all their top and left neighboring samples are fully reconstructed.

Secondly, due to the increased number of intra prediction modes, both HEVC and JEM define a set of MPM candidates when coding intra prediction mode predictively. Among the existing MPM candidates, some are obtained from the intra prediction modes of the spatial neighbors of the current block. In case the selected spatial neighbor is coded by the DIMD, the scanning order of the current block can only be obtained after the neighboring block is fully reconstructed at the decoding/reconstruction stage. This means that the transform coefficients of normal intra blocks which refers to one or more DIMD blocks as MPM candidates cannot be parsed until the reference DIMD blocks are fully reconstructed.

Thirdly, for chroma intra prediction, both HEVC and JEM allow selection of one of five modes: planar, DC, horizontal, vertical and DM (note that in addition to the five modes, JEM allows another cross-component linear mode (LM) where chroma components are predicted from the reconstructed luma component using a linear mode). The DM mode specifies that the chroma components use the same intra prediction mode of the luma component. Additionally, in order to remove the possible signaling redundancy, when the intra mode represented by the DM mode is one of planar, DC, horizontal and vertical, angular intra mode (34) is used to replace the duplicated intra mode. Therefore, it can be seen that the derivation of chroma intra prediction mode depends on the intra prediction mode of the corresponding luma component. Additionally, given that different quadtree plus binary tree ("QTBT") structures can be used for luma and chroma components separately in JEM3.0, such luma-chroma intra mode parsing dependency can make chroma intra mode not be able to be derived during the parsing stage. For example, in case the intra mode of the current chroma block is DM and the luma block that the chroma block refers to is coded by DIMD mode, the actual intra mode of the chroma block can only be obtained after the neighboring samples of the corresponding DIMD luma block are full reconstructed. This means that the transform coefficients of a chroma block that corresponds to one DIMD luma block cannot be parsed until the corresponding neighboring samples of luma DIMD block are fully reconstructed, and the intra mode of that luma DIMD block is derived.

All of the above three aspects may severely decrease the parsing throughput when applying the DIMD at an encoder/decoder.

Syntax parsing dependencies. Parsing dependency related with NSST. In the existing design of NSST in JEM-3.0, there are a total of 11×3+2=35 non-separable secondary transforms, where 11+1=12 is the number of transform sets defined based on intra prediction mode. Additionally, a different number of transform candidates is used for different transform set, where there are 2 transform candidates for transform set 0 (for DC, planar and LM) and 3 transform candidates for transform set 1-11 (for angular intra modes). When NSST is enabled, the selected secondary transform candidate is specified by signaling one CU-level NSST index. In order to reduce the NSST signaling overhead, truncated binary code (TBC) is used to code the NSST index, for which the number of transform candidates (e.g., the size of the transform set) needs to be known for binarization. Therefore, it can be seen that the NSST index cannot be parsed without knowing whether the intra mode of the current block is angular or not. In a case where the current block is coded by DIMD, such information cannot be obtained until the neighboring samples of the current block is reconstructed (e.g., at the decoding/reconstruction stage).

Parsing dependency related with RSAF. In the existing design of RSAF in JEM-3.0, adaptive reference filtering is only applied to intra blocks which are not coded by DC mode. Therefore, the decision whether the reference filtering is applied to the current block (which is done during the transform coefficient parsing stage through data hiding) is dependent on the intra mode of the current block. In a case where the current block is coded by DIMD, such information cannot be obtained before the decoding/reconstruction process.

Fixing Parsing Dependency for DIMD.

In the following, various embodiments are set forth to remove the parsing dependencies when the DIMD are jointly applied with the existing intra coding tools in JEM.

(1) Multiple solutions are proposed to remove the parsing dependency of transform coefficient scanning order on decoded intra prediction mode when DIMD is applied.

(2) Different solutions are proposed to remove the signaling dependencies of NSST and RSAF when they are applied in combination with DIMD.

Remove parsing dependency of transform coefficient scanning order on decoded DIMD intra mode. As discussed previously, in the existing design of HEVC and JEM, the scanning order of the transform coefficient, which is needed for parsing the transform coefficients of each intra coded block, depends on the decoded intra prediction mode. This design could introduce parsing dependency problems when applying the DIMD to the existing intra coding design because the intra mode of DIMD coded blocks cannot be obtained during the parsing stage. Embodiments are described below for removing the parsing dependency of coefficient scanning order on the intra mode derived by the DIMD.

In one embodiment, it is proposed to remove the parsing dependency of coefficient scanning order on DIMD intra mode by assuming a fixed intra mode is used for DIMD coded blocks at the parsing stage. Specifically, when one block is coded by the DIMD mode, a fixed intra mode is always assumed to be used to determine the scanning order of its transform coefficients. In this way, the decoder is able to parse the transform coefficients of each DIMD coded block without knowing its actual intra mode which is recovered during the decoding/reconstruction process.

Figure 16:
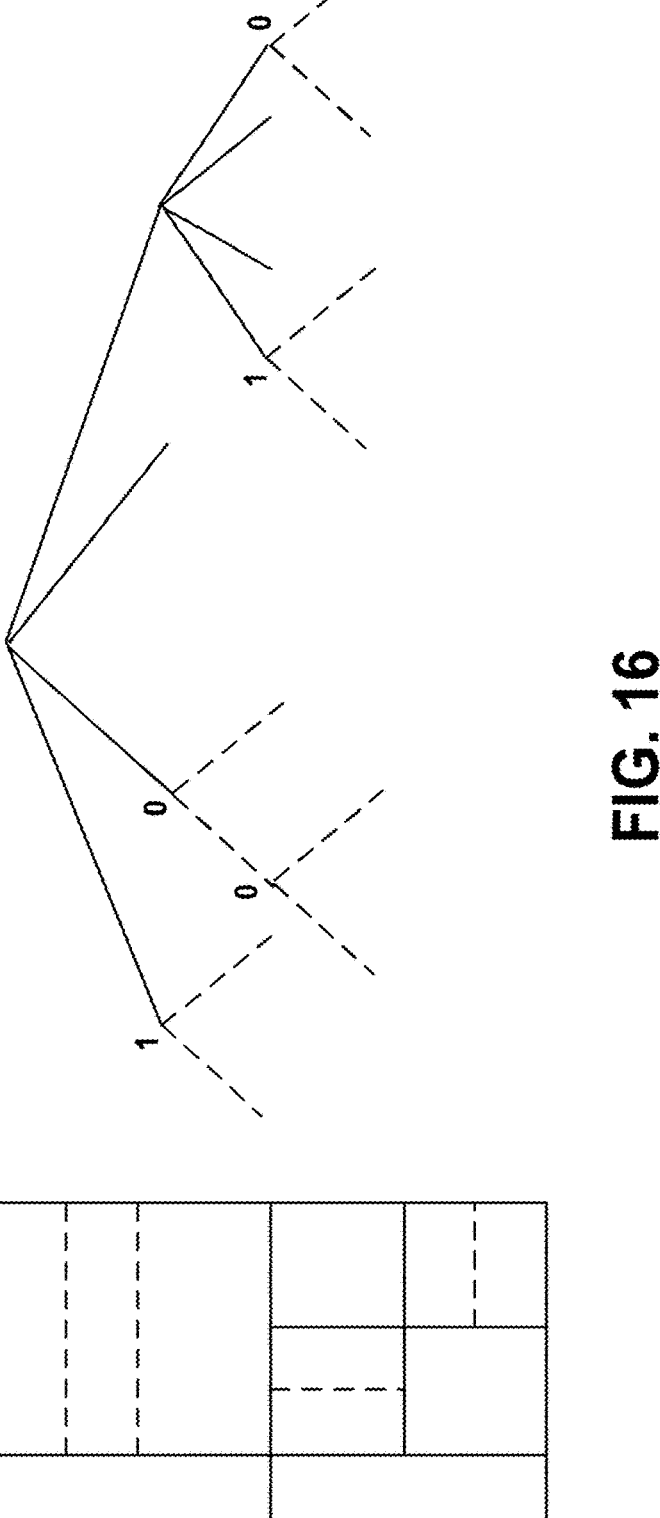
FIG. 16 illustrates one embodiment of a QTBT structure.
Figures 17A, 17B:
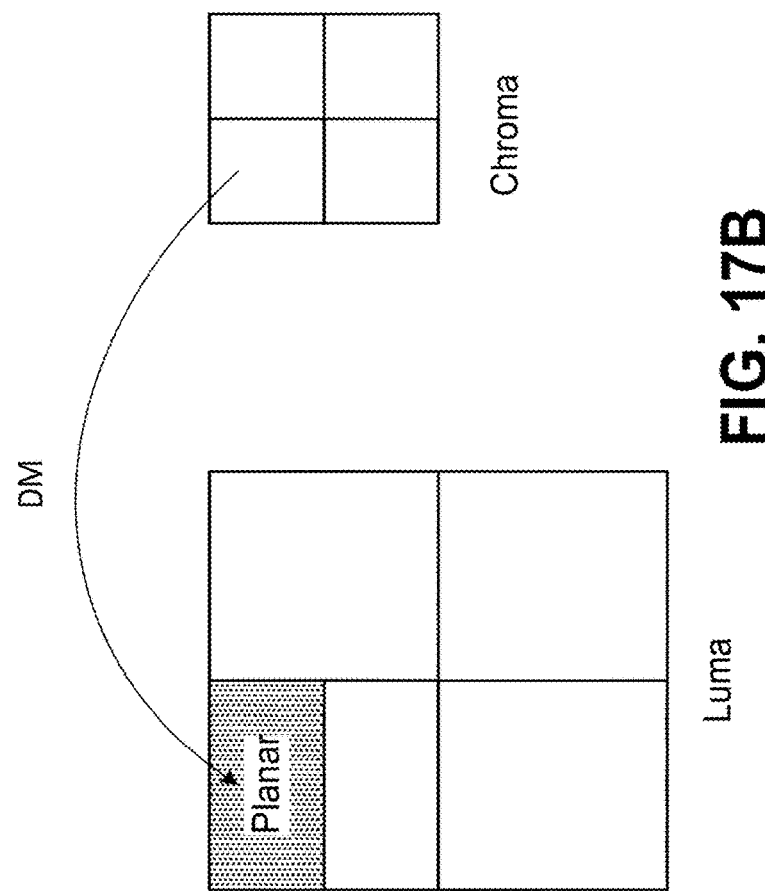
FIGS. 17A and 17B illustrate examples of using planar mode for DIMD coded blocks for (FIG. 17A) MPM-based intra mode prediction and (FIG. 17B) chroma DM mode. DIMD coded blocks are highlighted by shadow blocks.

Additionally, as mentioned previously, the intra mode derived by DIMD can also be used as an MPM candidate for predicting the intra mode of the spatial neighbors of the current block; also, when different QTBT (of which one exemplary embodiment is illustrated in FIG. 16) structures are used to code luma and chroma components separately, the DIMD intra mode derived for the luma component can also be referred to determine the scanning order of chroma transform coefficients when the chroma block selects DM mode. Therefore, in order to remove those parsing dependencies, the fixed intra mode is not only used for the parsing the transform coefficients of DIMD coded blocks but also used for the MPM-based intra mode prediction and chroma DM mode. FIGS. 17A and 17B illustrate two examples of using the intra modes of DIMD coded blocks (highlighted by shadow blocks) for MPM-based intra mode prediction and chroma DM mode, respectively, by assuming planar mode is always used for DIMD coded blocks.

In another embodiment, a fixed intra mode is always used for each DIMD coded block at the parsing stage. The selected intra mode is not only used for scanning the transform coefficients of the block but also used as MPM candidate for predicting the intra modes of its spatial neighbors. In case the selected intra mode significantly deviates from the actual intra mode of the DIMD block, this may severely reduce the efficiency of intra mode prediction for its neighboring blocks and therefore lower the overall coding efficiency. To address this, an intra mode propagation method is disclosed to propagate the intra modes of normal intra blocks (e.g., explicitly signaled intra modes) into the DIMD blocks. Specifically, this embodiment derives the intra mode of each DIMD block that is used to determine the coefficient scanning order at the parsing stage from the intra modes of its spatial neighbors, such that the decoder is capable of parsing the transform coefficients without access to the decoded intra mode of the DIMD block. Additionally, due to the strong correlation between the intra modes of spatial neighboring blocks, this embodiment can usually provide a good estimate of the decoded intra mode of DIMD block, therefore minimize the coding efficiency loss incurred from transform coefficients scanning. Additionally, given that the propagated intra mode can be used as MPM candidate to predict the intra mode of neighboring normal intra blocks, this method may enhance the correlation between intra modes of spatial adjacent blocks, which may be beneficial to improve the signaling efficiency of explicit intra mode.

Figures 18A, 18B:
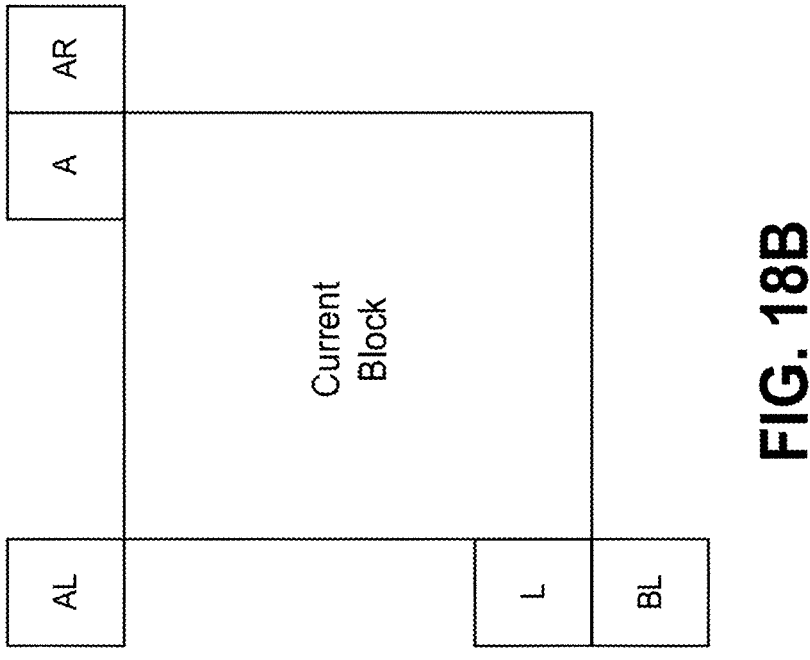
FIGS. 18A and 18B illustrate positions of the spatial neighbors used by the intra mode propagation method.

Different sets of spatial neighbors may be used in the intra mode propagation method to derive the intra mode of each DIMD coded block. In one embodiment, the set of the spatial neighbors consists of the blocks at the top neighboring row and the left neighboring column of the current DIMD block; and the intra mode that is most frequently used among the spatial neighbors is selected as the propagated intra mode of the DIMD block. In another embodiment of the disclosure, the five spatial neighbor candidates as defined in the merge mode, e.g., left (L), above (A), below-left (BL), above-right (AR) and above-left (AL), are used; and the intra mode that is most frequently used among the five spatial neighbors is selected as the propagated intra mode the DIMD block. In the second method, only the intra modes of the five neighbors are considered, instead of the intra modes of all the spatial neighbors as in the first method. This could simplify the complexity of intra mode propagation and also make the process more consistent with the existing design of HEVC and JEM. FIGS. 18A and 18B illustrate the positions of the spatial neighbors used by the intra mode propagation method. Additionally, in each of the above two spatial neighbor selection methods, if any candidate neighboring block is not intra-coded or outside the current slice/tile, it is considered as unavailable. In another embodiment, if any spatial neighbor is not intra-coded or outside the current slice/tile, it is always considered as being coded by a fixed intra mode (e.g., planar). It should be mentioned that the fixed intra mode (as described in embodiment one) and the propagated intra mode (as described in embodiment two) are only used at the parsing stage. In order to preserve the quality of intra prediction, the intra mode of each DIMD coded block may be adjusted based on the template-based intra mode derivation method using the reconstructed samples of neighboring blocks, as described previously.

Remove syntax parsing dependency of NSST and RSAF on decoded DIMD intra mode. As disclosed above, different number of secondary transform candidates are defined for angular intra modes (4 transform candidates) and non-angular intra modes (3 transform candidates) in the current NSST design. And, as the TBC is used to code the NSST index, the number of available transform candidates may be specified for the binarization process. Additionally, the reference sample filtering is not enabled for DC mode. These designs could lead to syntax parsing dependency when being jointly applied with DIMD, as the intra mode of each DIMD block is not obtained until its neighboring samples are fully reconstructed. To solve those syntax parsing dependency problems, in one embodiment of the disclosure, a method may assume DIMD blocks to be coded by a fixed intra mode (e.g., planar mode) when parsing the NSST and RSAF related syntax elements. In another embodiment of the disclosure, a method may use the propagated intra mode (as described above) to parse the NSST and RSAF related syntax elements. In another embodiment of the disclosure, a method may remove the syntax signaling conditions of NSST and RSAF on intra mode when one block is coded by the DIMD mode, such that the NSST and RSAF syntax elements can be parsed without knowing the corresponding intra mode. For example, a method may always use 4 transform candidates or 3 transform candidates for DIMD coded blocks; additionally, a method may always enable or disable RSAF for DIMD coded blocks.

Network and Device Architecture.

Exemplary embodiments disclosed herein are implemented using one or more wired and/or wireless network nodes, such as a wireless transmit/receive unit (WTRU) or other network entity.

Figures 12, 13:
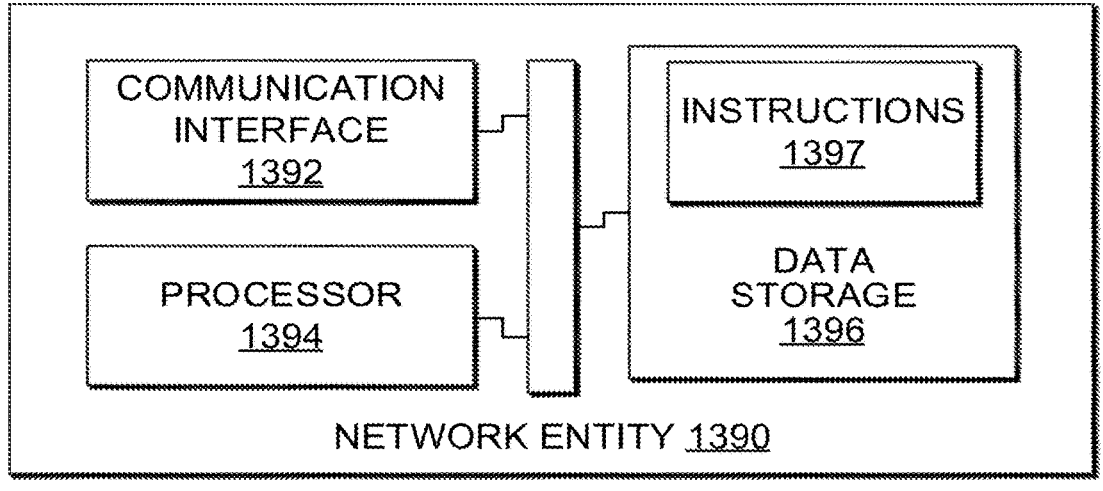
FIG. 12 illustrates an exemplary wireless transmit/receive unit (WTRU) that may be employed as an encoder or decoder in some embodiments.
FIG. 13 illustrates an exemplary network entity that may be employed in some embodiments.

FIG. 12 is a system diagram of an exemplary WTRU 1202, which may be employed as an encoder and/or decoder in embodiments described herein. As shown in FIG. 12, the WTRU 1202 may include a processor 1218, a communication interface 1219 including a transceiver 1220, a transmit/receive element 1222, a speaker/microphone 1224, a keypad 1226, a display/touchpad 1228, a non-removable memory 1230, a removable memory 1232, a power source 1234, a global positioning system (GPS) chipset 1236, and sensors 1238. It will be appreciated that the WTRU 1202 may include any sub-combination of the foregoing elements while remaining consistent with an embodiment.

The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1202 to operate in a wireless environment. The processor 1218 may be coupled to the transceiver 1220, which may be coupled to the transmit/receive element 1222. While FIG. 6 depicts the processor 1218 and the transceiver 1220 as separate components, it will be appreciated that the processor 1218 and the transceiver 1220 may be integrated together in an electronic package or chip.

The transmit/receive element 1222 may be configured to transmit signals to, or receive signals from, a base station over the air interface 1216. For example, in one embodiment, the transmit/receive element 1222 may be an antenna configured to transmit and/or receive RF signals. In another embodiment, the transmit/receive element 1222 may be an emitter/detector configured to transmit and/or receive IR, UV, or visible light signals, as examples. In yet another embodiment, the transmit/receive element 1222 may be configured to transmit and receive both RF and light signals. It will be appreciated that the transmit/receive element 1222 may be configured to transmit and/or receive any combination of wireless signals.

In addition, although the transmit/receive element 1222 is depicted in FIG. 12 as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1216.

The transceiver 1220 may be configured to modulate the signals that are to be transmitted by the transmit/receive element 1222 and to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as UTRA and IEEE 802.11, as examples.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In other embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. As examples, the power source 1234 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1218 may also be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1216 from a base station and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 13 depicts an exemplary network entity 1390 that may be used in embodiments of the present disclosure. As depicted in FIG. 13, network entity 1390 includes a communication interface 1392, a processor 1394, and non-transitory data storage 1396, all of which are communicatively linked by a bus, network, or other communication path 1398.

Communication interface 1392 may include one or more wired communication interfaces and/or one or more wireless-communication interfaces. With respect to wired communication, communication interface 1392 may include one or more interfaces such as Ethernet interfaces, as an example. With respect to wireless communication, communication interface 1392 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1392 may be equipped at a scale and with a configuration appropriate for acting on the network side—as opposed to the client side—of wireless communications (e.g., LTE communications, Wi-Fi communications, and the like). Thus, communication interface 1392 may include the appropriate equipment and circuitry (perhaps including multiple transceivers) for serving multiple mobile stations, UEs, or other access terminals in a coverage area.

Processor 1394 may include one or more processors of any type deemed suitable by those of skill in the relevant art, some examples including a general-purpose microprocessor and a dedicated DSP.

Data storage 1396 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 13, data storage 1396 contains program instructions 1397 executable by processor 1394 for carrying out various combinations of the various network-entity functions described herein.

Figure 14:
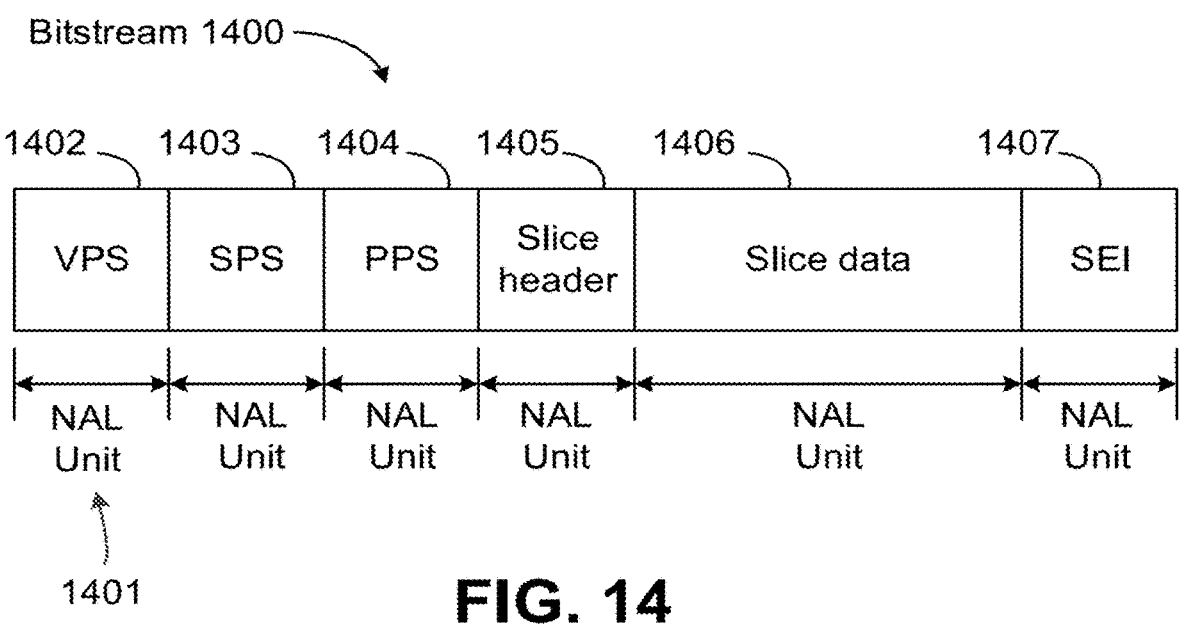
FIG. 14 is a diagram illustrating an example of a coded bitstream structure.

FIG. 14 is a schematic diagram illustrating an example of a coded bitstream structure. A coded bitstream 1400 consists of a number of NAL (Network Abstraction layer) units 1401. A NAL unit may contain coded sample data such as coded slice 1406, or high level syntax metadata such as parameter set data, slice header data 1405 or supplemental enhancement information data 1407 (which may be referred to as an SEI message). Parameter sets are high level syntax structures containing essential syntax elements that may apply to multiple bitstream layers (e.g., video parameter set 1402 (VPS)), or may apply to a coded video sequence within one layer (e.g., sequence parameter set 1403 (SPS)), or may apply to a number of coded pictures within one coded video sequence (e.g., picture parameter set 1404 (PPS)). The parameter sets can be either sent together with the coded pictures of the video bit stream, or sent through other means (including out-of-band transmission using reliable channels, hard coding, etc.). Slice header 1405 is also a high level syntax structure that may contain some picture-related information that is relatively small or relevant only for certain slice or picture types. SEI messages 1407 carry the information that may not be needed by the decoding process but can be used for various other purposes such as picture output timing or display as well as loss detection and concealment.

Figure 15:
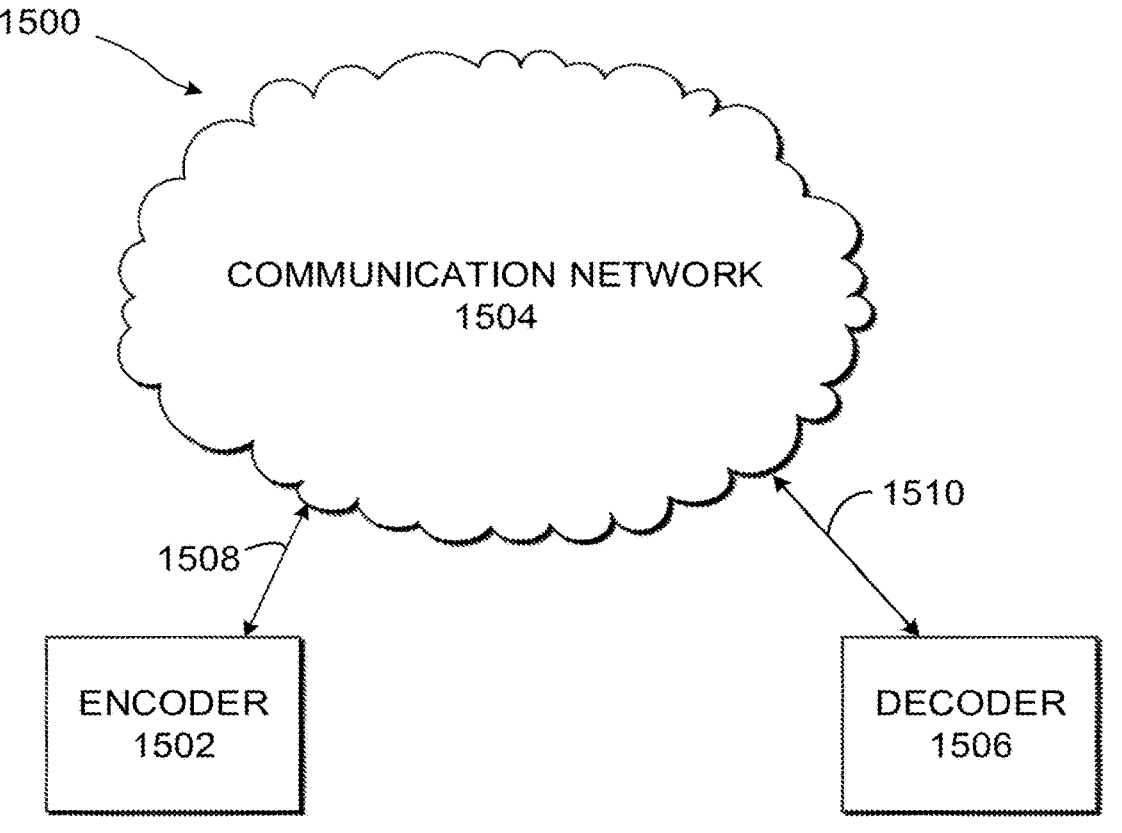
FIG. 15 is a diagram illustrating an example communication system.

FIG. 15 is a schematic diagram illustrating an example of a communication system. The communication system 1500 may comprise an encoder 1502, a communication network 1504, and a decoder 1506. The encoder 1502 may be in communication with the network 1504 via a connection 1508, which may be a wireline connection or a wireless connection. The encoder 1502 may be similar to the block-based video encoder of FIG. 1. The encoder 1502 may include a single layer codec or a multilayer codec. For example, the encoder 1502 may be a multi-layer (e.g., two-layer) scalable coding system with picture-level ILP support. The decoder 1506 may be in communication with the network 1504 via a connection 1510, which may be a wireline connection or a wireless connection. The decoder 1506 may be similar to the block-based video decoder of FIG. 2. The decoder 1506 may include a single layer codec or a multilayer codec. For example, the decoder 1506 may be a multi-layer (e.g., two-layer) scalable decoding system with picture-level ILP support.

The encoder 1502 and/or the decoder 1506 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1504 may be a suitable type of communication network. For example, the communications network 1504 may be a multiple access system that provides content, such as voice, data, video, messaging, broadcast, etc., to multiple wireless users. The communications network 1504 may enable multiple wireless users to access such content through the sharing of system resources, including wireless bandwidth. For example, the communications network 1504 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1504 may include multiple connected communication networks. The communication network 1504 may include the Internet and/or one or more private commercial networks such as cellular networks, WiFi hotspots, Internet Service Provider (ISP) networks, and/or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method of encoding video data into a bitstream, comprising:

predicting a video block from a frame of the video data using decoder-side intra mode derivation (DIMD), the predicting comprising:

selecting candidate intra prediction modes from among intra prediction modes that are used by neighboring video blocks, determining respective costs of using the selected candidate intra prediction modes to predict samples in a template region adjacent to the video block, deriving an intra prediction mode from among the selected candidate intra prediction modes having the lowest cost, and predicting samples in the video block using the derived intra prediction mode.

2. The method according to claim 1, wherein the neighboring video blocks include video blocks in a spatial neighborhood of the video block, in a temporal neighborhood of the video block, or in both.

3. The method according to claim 1, wherein the selecting of the candidate intra prediction modes comprises:

selecting candidates, of the intra prediction modes used by the neighboring video blocks, that are most frequently used by the neighboring video blocks.

4. The method according to claim 1, further comprising:

adding, before the determining, to the selected candidate intra prediction modes at least one of a DC mode and a planar mode, if not already included.

5. The method according to claim 1, further comprising:

refining the derived intra prediction mode by:

obtaining candidate intra prediction modes within a range centered at the derived intra prediction mode, determining respective costs of using the obtained candidate intra prediction modes to predict samples in the template region adjacent to the video block, deriving a refined intra prediction mode from the obtained candidate intra prediction modes having the lowest cost, wherein the predicting of the samples is performed by using the refined intra prediction mode.

6. The method according to claims 1, wherein each of the determined costs is a measure of distortion between the template region and a prediction of the template region using a respective candidate intra prediction mode.

7. The method according to claim 1, further comprising:

determining at least one of a size of the template region and a layout of the template region.

8. An apparatus for encoding video data into a bitstream, comprising:

at least one processor; and memory storing instructions that, when executed by the at least one processor, cause the apparatus to predict a video block from a frame of the video data using DIMD, the predicting comprising:

selecting candidate intra prediction modes from among intra prediction modes that are used by neighboring video blocks, determining respective costs of using the selected candidate intra prediction modes to predict samples in a template region adjacent to the video block, deriving an intra prediction mode from among the selected candidate intra prediction modes having the lowest cost, and predicting samples in the video block using the derived intra prediction mode.

9. The apparatus according to claim 8, wherein the instructions further cause the apparatus to:

code, into the bitstream, a flag indicating that the DIMD is used for the video block.

10. The apparatus according to claim 8, wherein the neighboring video blocks include video blocks in a spatial neighborhood of the video block, in a temporal neighborhood of the video block, or in both.

11. The apparatus according to claim 8, wherein the selecting of the candidate intra prediction modes comprises:

selecting candidates, of the intra prediction modes used by the neighboring video blocks, that are most frequently used by the neighboring video blocks; and adding to the selected candidate intra prediction modes at least one of a DC mode and a planar mode, if not already included.

12. A method of decoding video data from a bitstream, comprising:

predicting a video block from a frame of the video data using DIMD, the predicting comprising:

selecting candidate intra prediction modes from among intra prediction modes that are used by neighboring video blocks, determining respective costs of using the selected candidate intra prediction modes to predict samples in a template region adjacent to the video block, deriving an intra prediction mode from among the selected candidate intra prediction modes having the lowest cost, and predicting samples in the video block using the derived intra prediction mode.

13. The method according to claim 12, further comprising:

decoding, from the bitstream, a flag indicating that the DIMD is used for the video block.

14. The method according to claim 12, wherein the neighboring video blocks include blocks in a spatial neighborhood of the current block, in a temporal neighborhood of the current block, or in both.

15. The method according to claim 12, wherein the selecting of the candidate intra prediction modes comprises:

selecting candidates, of the intra prediction modes used by the neighboring video blocks, that are most frequently used by the neighboring video blocks.

16. The method according to claim 12, further comprising:

adding, before the determining, to the selected candidate intra prediction modes at least one of a DC mode and a planar mode, if not already included.

17. An apparatus for decoding video data from a bitstream, comprising:

at least one processor; and memory storing instructions that, when executed by the at least one processor, cause the apparatus to predict a video block from a frame of the video data using DIMD, the predicting comprising:

selecting candidate intra prediction modes from among intra prediction modes that are used by neighboring video blocks, determining respective costs of using the selected candidate intra prediction modes to predict samples in a template region adjacent to the video block, deriving an intra prediction mode from among the selected candidate intra prediction modes having the lowest cost, and predicting samples in the video block using the derived intra prediction mode.

18. The apparatus according to claim 17, wherein the instructions further cause the apparatus to:

decode, from the bitstream, a flag indicating that the DIMD is used for the video block.

19. The apparatus according to claim 17, wherein the neighboring video blocks include blocks in a spatial neighborhood of the current block.

20. The apparatus according to claim 17, wherein the neighboring video blocks include blocks in a temporal neighborhood of the current block.

* * * * *